US008577189B2

(12) United States Patent
Yamada et al.

(10) Patent No.: US 8,577,189 B2
(45) Date of Patent: Nov. 5, 2013

(54) LIGHT GUIDE, LIGHT TRANSMISSION MODULE, ELECTRONIC DEVICE, AND MANUFACTURING METHOD OF LIGHT GUIDE

(75) Inventors: Junichiro Yamada, Nara (JP); Akihiko Sano, Uji (JP); Yoshitaka Tatara, Yasu (JP); Naoki Yoshitake, Nara (JP); Tetsuro Kubota, Kyoto (JP)

(73) Assignee: OMRON Corporation, Kyoto (JP)

( * ) Notice: Subject to any disclaimer, the term of this patent is extended or adjusted under 35 U.S.C. 154(b) by 604 days.

(21) Appl. No.: 12/674,061

(22) PCT Filed: Oct. 7, 2008

(86) PCT No.: PCT/JP2008/068238
§ 371 (c)(1),
(2), (4) Date: Feb. 18, 2010

(87) PCT Pub. No.: WO2009/054259
PCT Pub. Date: Apr. 30, 2009

(65) Prior Publication Data
US 2011/0292661 A1    Dec. 1, 2011

(30) Foreign Application Priority Data

Oct. 23, 2007   (JP) .................................. 2007-275746

(51) Int. Cl.
*H01S 5/02* (2006.01)
(52) U.S. Cl.
USPC .............................. 385/14; 362/612; 362/341
(58) Field of Classification Search
USPC ...................................... 385/14; 362/612, 341
See application file for complete search history.

(56) References Cited

U.S. PATENT DOCUMENTS

| 6,375,335 | B1 * | 4/2002 | Tabata et al. ................... 362/612 |
| 6,445,854 | B1 | 9/2002 | Miller |
| 6,487,224 | B1 | 11/2002 | Ohashi et al. |

(Continued)

FOREIGN PATENT DOCUMENTS

| EP | 1522882 A1 | 4/2005 |
| JP | 2000-117465 A | 4/2000 |
| JP | 2004-258076 A | 9/2004 |
| JP | 2007-212899 A | 8/2007 |

OTHER PUBLICATIONS

Extended European Search Report for Application No. 08842282.9-1524, mailed on Nov. 14, 2011, 5 pages.

(Continued)

*Primary Examiner* — Anabel Ton
(74) *Attorney, Agent, or Firm* — Osha Liang LLP

(57) ABSTRACT

A light guide includes a core made of material having translucency and an optical path conversion mirror for reflecting the signal light from the optical element and converting the optical path of the signal light formed on at least the core. The signal light is transmitted through the core by the reflection at the optical path conversion mirror. The optical path conversion mirror surface has an inclination angle α formed with a bottom surface of the core changing in the X-direction in a cross-sectional shape in which the core is cut at a YZ plane, the Y-direction being an optical axis direction of the optical element, the Z-direction being an advancing direction of the signal light of the light guide, and the X-direction being a direction perpendicular to both the Y-direction and the Z-direction.

13 Claims, 22 Drawing Sheets

(56) References Cited

U.S. PATENT DOCUMENTS

| | | | |
|---|---|---|---|
| 7,095,920 B1 * | 8/2006 | Little | 385/30 |
| 7,565,054 B2 * | 7/2009 | Rinko | 385/146 |
| 7,792,407 B2 * | 9/2010 | Feuer et al. | 385/129 |
| 2006/0198569 A1 | 9/2006 | Ohtsu et al. | |
| 2011/0123147 A1 * | 5/2011 | Sameshima et al. | 385/14 |

OTHER PUBLICATIONS

International Search Report w/translation from PCT/JP2008/068238 dated Nov. 25, 2008 (4 pages).

Written Opinion from PCT/JP2008/068238 dated Nov. 25, 2008 (4 pages).

* cited by examiner

LIGHT GUIDE, LIGHT TRANSMISSION MODULE, ELECTRONIC DEVICE, AND MANUFACTURING METHOD OF LIGHT GUIDE

TECHNICAL FIELD

The present invention relates to a light guide, a light transmission module, an electronic device, and a manufacturing method of the light guide.

BACKGROUND ART

In recent years, optical communication network enabling large capacity data communication at high speed is expanding. The optical communication network is assumed to be mounted on a commercial-off-the-shelf device in the future. An electrical input/output optical data transmission cable (optical cable) capable of being used no different from the present electrical cable is desired for the application of large capacity data transfer at higher speed, noise countermeasures, and data transmission between substrates in the device. In view of flexibility, a film light guide is desirably used for the optical cable.

The light guide is formed by a core having a large index of refraction and a clad having a small index of refraction arranged contacting the periphery of the core, and propagates the optical signal entered to the core while repeating total-reflection at the boundary of the core and the clad. The film light guide has flexibility since the core and the clad are made of a flexible polymer material.

In recent years, in particular, realizing the flexible light guide to be mounted on a bendable display and a smaller and thinner commercial-off-the-shelf device with a light guide is being desired. For instance, patent document 1 describes a light guide having a tapered surface with a tapering angle of 45° at the end.

FIGS. 29(a) and 29(b) show a configuration of a conventional light guide, where FIG. 29(a) is a perspective view, and FIG. 29(b) is a cross-sectional view. In FIGS. 29(a) and 29(b), the width direction of the light guide 4' is the X-axis direction, the height direction is the Y-axis direction, and the longitudinal direction (optical axis direction) is the Z-axis direction.

As shown in FIG. 29(a), the optical path conversion mirror optical path conversion mirror 4'A of the light guide 4' is not perpendicular to the optical axis (Z-axis), and is a tapered surface cut at the tapering angle of 45°. The optical path conversion mirror optical path conversion mirror 4'A is perpendicular with respect to the YZ plane. The angle (tapering angle; 45°) formed by the optical path conversion mirror optical path conversion mirror 4'A and a bottom surface 4'B of the light guide is uniform in the X-axis direction.

Thus, the signal light emitted from a light emitting portion 101 is reflected at the tapered surface 4'A so that the advancing direction is changed, and transmitted through the light guide 100.

As another configuration of the conventional light guide, patent document 2 describes a configuration in which the shape of the optical path conversion mirror optical path conversion mirror of the light guide is a lens shape. According to such configuration, the signal light emitted from the light emitting portion is reflected at the end face of the lens shape so that the advancing direction is changed to be parallel to the longitudinal direction of the light guide, and transmitted through the light guide.

Lights having various intensity distributions are propagated since the size of the core is large. The conventional light guide has an inclination angle of the optical path conversion mirror surface set so that the optical path of the signal light is converted to be parallel to the light transmitting direction, and the signal light propagating through the light guide is propagated while being collected or diffused.

Problems do not arise in a rigid light guide or a multimode fiber in which the core is circular, but if bend and twist are applied at the light collecting area in a thinner light guide giving great importance to flexibility, the loss of the signal light at the relevant area becomes large compared to when the signal light in the core is uniformed. In the flexible light guide where bend and twist freely occur, the location of the bend and twist is difficult to specify, and a stable signal quality is difficult to ensure in the prior art.

Patent document 1: Japanese Laid-Open Patent Publication "Japanese Laid-Open Patent Publication No. 2000-117465 (date of publication: Apr. 25, 2000).

Patent document 2: Japanese Laid-Open Patent Publication "Japanese Laid-Open Patent Publication No. 2004-258076 (date of publication: Sep. 16, 2004).

DISCLOSURE OF THE INVENTION

One or more embodiments of the present invention provide a light guide capable of stably controlling the amount of loss of the signal light with respect to the bend and the twist in a region near the optical path conversion mirror, a light transmission module, an electronic device, and a manufacturing method of the light guide.

In one or more embodiments the light guide according to the present invention relates to a light guide including a core made of material having translucency; and an optical path conversion mirror portion formed with an optical path conversion mirror surface, on at least the core at an end, for reflecting a signal light from an optical element and converting the optical path of the signal light; the signal light being transmitted through the core by the reflection at the optical path conversion mirror surface, wherein the optical path conversion mirror surface has an angle formed with a bottom surface of the core changing in an X-direction in a cross-sectional shape in which the optical path conversion mirror portion is cut at a YZ plane, the Y-direction being an optical axis direction of the optical element, the Z-direction being an advancing direction of the signal light of the light guide, and the X-direction being a direction perpendicular to both the Y-direction and the Z-direction.

According to the above configuration, the optical path conversion mirror surface has the angle formed with the bottom surface of the core changing in the X-direction in the cross-sectional shape in which the optical path conversion mirror portion is cut at the YZ plane when the Y-direction is the optical axis direction of the optical element, the Z-direction is the advancing direction of the signal light of the light guide, and the X-direction is the direction perpendicular to both the Y-direction and the Z-direction, and thus the symmetric property of the intensity in the advancing direction of the light is lost when the light enters the light guide from the optical element, and the light intensity can be uniformed at a distance close from the end of the light guide.

Generally, the signal light is propagated through the core while repeating diffusion and reflection for the optical path width in the light guide. The signal light thus has wider optical path width and the intensity distribution becomes uniform the longer the guiding distance (optical path length) of the signal light propagating through the core. According to the above configuration, a plurality of peak lights does not have the reflecting direction at the optical path conversion mirror parallel to the longitudinal direction and becomes a light propagated asymmetric to the propagating direction. Thus, even if the core length in the longitudinal direction is the same from the optical path conversion mirror, the light guide of the above configuration can reduce the occurrence of light interference compared to the conventional light guide. Consequently, according to the above configuration, the propagation light in which the intensity distribution having plural peak lights generated at the vicinity of the optical path conversion mirror is more uniform than the conventional light guide. Therefore, the loss that occurs from the bend and the twist does not vary depending on the location, and the amount of loss of the signal light can be stably controlled.

According to the above configuration, the optical path conversion mirror portion may have the cut shape of any one of step difference shape, waveform shape, or zigzag shape. The step difference shape is a shape in which the angle the optical path conversion mirror surface forms with the bottom surface of the core is constant in one partial zone and discontinuously changes in another partial zone in the X-direction. The waveform shape is a shape in which the angle the optical path conversion mirror surface forms with the bottom surface of the core continuously increases or decreases in the X-direction. The increase and decrease may be any number of times. The zigzag shape is a shape in which the angle the optical path conversion mirror surface forms with the bottom surface of the core discontinuously increases or decreases in the X-direction. The increase and decrease may be any number of times.

In one or more embodiments the light transmission module according to the present invention includes the light guide, and a light source for applying light to the core of the light guide.

Thus, the intensity distribution of the signal light can be uniformed in a region closer to the optical path conversion mirror of the light guide. As a result, a light transmission module capable of stably controlling the amount of loss of the signal light can be realized.

In one or more embodiments the electronic device according to the present invention includes the light transmission module described above.

Thus, the intensity distribution of the signal light can be uniformed in a region closer to the optical path conversion mirror of the light guide, and as a result, an electronic device capable of stably controlling the amount of loss of the signal light can be realized. Furthermore, the configuration of the optical module in which a light receiving element is arranged at the end on the opposite side of the light emitting element side of the light guide is preferable.

In one or more embodiments the manufacturing method of the light guide according to the present invention relates to a manufacturing method of a light guide including a core made of material having translucency, and an optical path conversion mirror portion formed with an optical path conversion mirror surface, on at least the core at an end, for reflecting a signal light from an optical element and converting the optical path of the signal light, the signal light being transmitted through the core by the reflection at the optical path conversion mirror surface, the manufacturing method including core optical path conversion mirror forming step of forming the optical path conversion mirror of the core as an inclined surface inclined with respect to a Z-direction of the light guide, the Z-direction being an advancing direction of the signal light of the light guide; wherein the optical path conversion mirror surface is formed by cutting the core so that an angle formed with a bottom surface of the core changes in an X-direction in a cross-sectional shape in which the optical path conversion mirror portion is cut at a YZ plane in the core optical path conversion mirror forming step, the Y-direction being an optical axis direction of the optical element, and the X-direction being a direction perpendicular to both the Y-direction and the Z-direction.

According to the above configuration, the optical path conversion mirror surface is formed by cutting the core so that the angle formed with the bottom surface of the core changes in the X-direction in the cross-sectional shape in which the optical path conversion mirror portion is cut at the YZ plane in the core optical path conversion mirror forming step, and thus the intensity distribution of the signal light can be uniformed in a region closer to the optical path conversion mirror of the light guide, and as a result, a light guide capable of stably controlling the amount of loss of the signal light can be realized.

Other further objects, characteristics, and advantages of the present invention should become apparent from the following description.

BRIEF DESCRIPTION OF THE DRAWINGS

FIG. 8(c) is an explanatory view showing the simulation condition of the optical path conversion mirror in the conventional light guide.

FIG. 29(a) is a perspective view, and FIG. 29(b) is a cross-sectional view.

Figure 1:
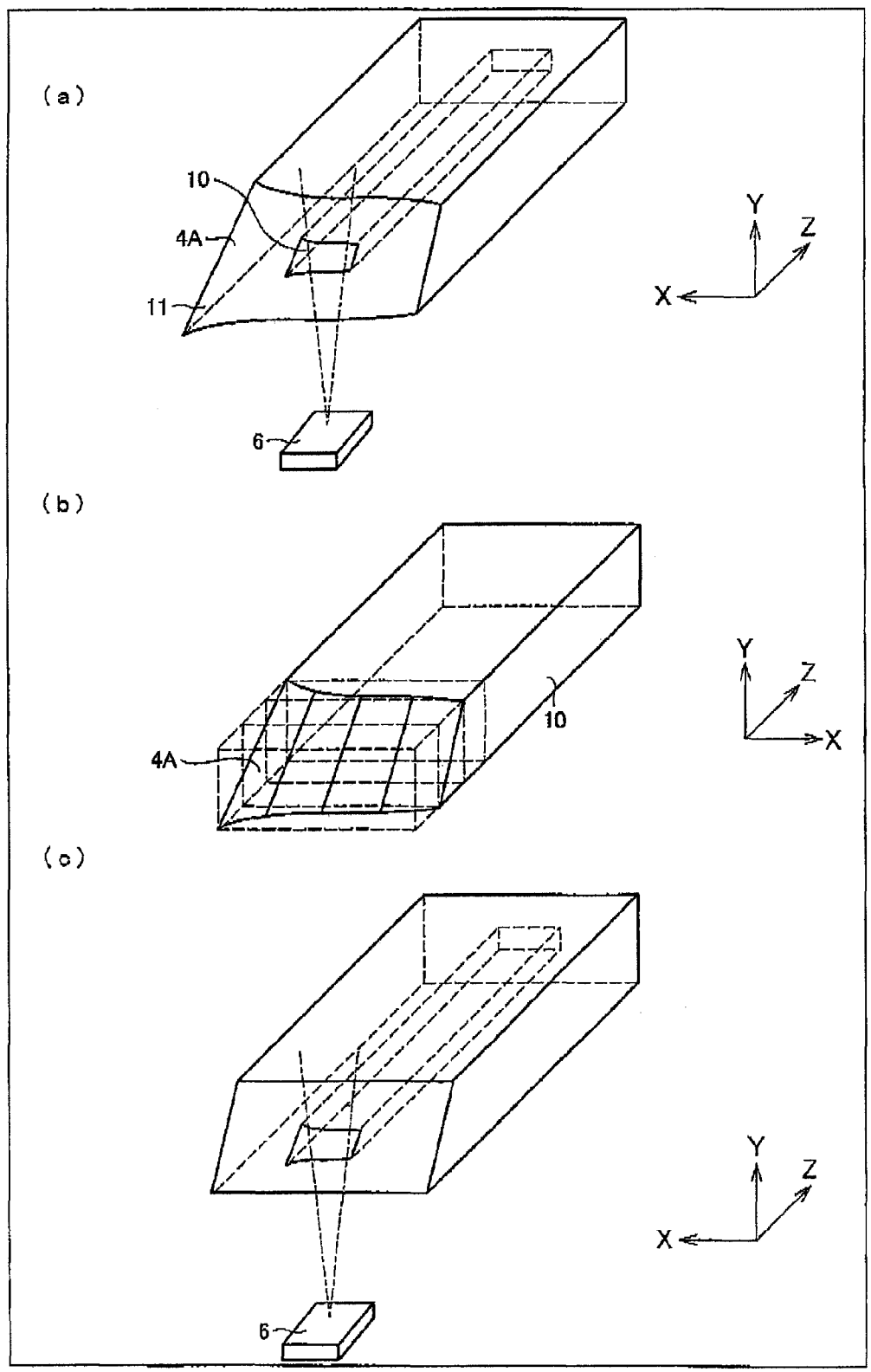
FIGS. 1($a$) to 1($c$) show a schematic configuration of a light guide according to one embodiment of the present invention, where FIG. 1($a$) is a perspective view, FIG. 1($b$) is a perspective view showing only the configuration of the core, and FIG. 1($c$) is a variant of the configuration of FIG. 1($a$) and is a perspective view showing a configuration in which only the optical path conversion mirror of the core is a twisted surface.

DESCRIPTION OF SYMBOLS 1 optical module
2 light transmission processing unit
3 light reception processing unit
4 light guide
4A optical path conversion mirror
4B light exit surface
5 light emission drive portion
6 light emitting portion (light source)
7 amplifier
8 light receiving portion
9 peak light
9A point of light collection
10 core
10A bottom surface
10B upper surface
10C central part in width direction
11 clad

BEST MODE FOR CARRYING OUT THE INVENTION

One embodiment of the present invention will be hereinafter described based on the drawings.

(Configuration of Light Transmission Module)

Figure 2:
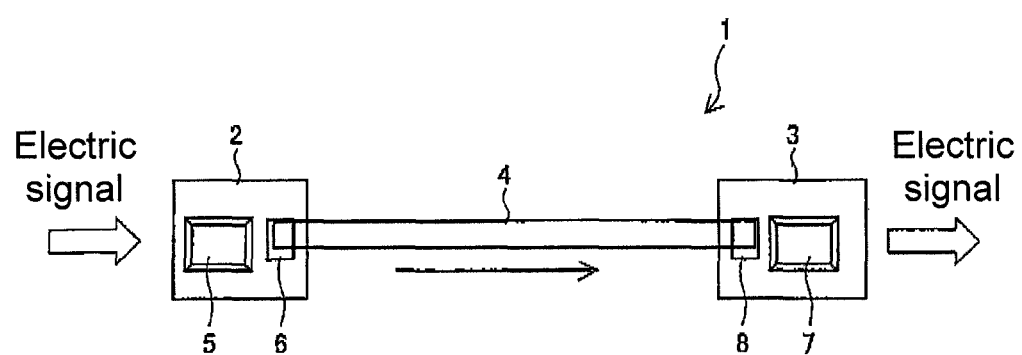
FIG. 2 is a view showing a schematic configuration of a light transmission module according to the present embodiment.

FIG. 2 shows a schematic configuration of an optical module 1 according to the present embodiment. As shown in the figure, the optical module 1 includes a light transmission processing unit 2, a light reception processing unit 3, and a light guide 4.

The light transmission processing unit 2 is configured to include a light emission drive portion 5 and a light emitting portion (light source) 6. The light emission drive portion 5 drives the light emission of the light emitting portion 6 based on an electric signal input from outside. The light emission drive portion 5 is configured by an IC (Integrated Circuit) for light emission drive. Although not shown, the light emission drive portion 5 includes an electrical connecting portion with respect to an electrical wiring for transmitting the electric signal from the outside.

The light emitting portion 6 emits light based on the drive control by the light emission drive portion 5. The light emitting portion 6 is configured by a light emitting element such as a VCSEL (Vertical Cavity-Surface Emitting Laser). The light emitted from the light emitting portion 6 is applied to the light incident side end of the light guide 4 as an optical signal.

The light reception processing unit 3 is configured to include an amplifier 7 and a light receiving portion 8. The light receiving portion 8 receives the light serving as the optical signal exit from the light exit side end of the light guide 4, photoelectric-converts the same, and outputs an electric signal. The light receiving portion 8 is configured by a light receiving element such as a PD (Photo-Diode).

The amplifier 7 amplifies the electric signal output from the light receiving portion 8, and outputs to the outside. The amplifier 7 is configured by an IC for amplification. Although not shown, the amplifier 7 includes an electrical connecting portion with respect to an electrical wiring for transmitting the electric signal to the outside.

The light guide 4 is a medium for transmitting the light exit from the light emitting portion 6 to the light receiving portion 8. The details on the configuration of the light guide 4 will be described later.

Figure 3:
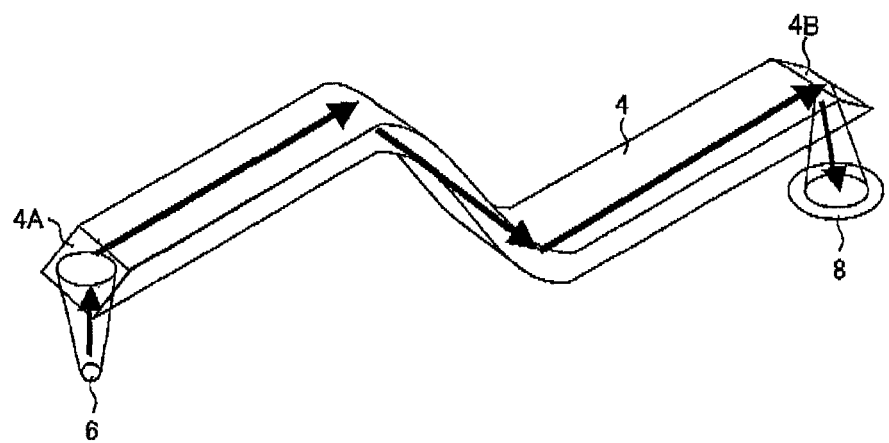
FIG. 3 is a view schematically showing a state of light transmission in the light transmission path.

FIG. 3 is a view schematically showing a state of light transmission in the light guide 4. As shown in the figure, the light guide 4 is configured by a column-shaped member having flexibility. An optical path conversion mirror 4A is arranged at the light incident side end of the light guide 4, and a light exit surface 4B is arranged at the light exit side end.

The light exit from the light emitting portion 6 enters the light incident side end of the light guide 4 from a direction perpendicular to the light transmitting direction of the light guide 4. The incident light advances through the light guide 4 by being reflected at the optical path conversion mirror 4A. The light that advanced through the light guide 4 and reached the light exit side end is reflected at the light exit surface 4B, and exit in a direction perpendicular to the light transmitting direction of the light guide 4. The exit light is applied to the light receiving portion 8, and subjected to photoelectric conversion in the light receiving portion 8.

According to such configuration, a configuration in which the light emitting portion 6 serving as a light source is arranged in the transverse direction with respect to the light transmitting direction may be adopted with respect to the light guide 4. Thus, when the light guide 4 needs to be arranged parallel to the substrate surface, the light emitting portion 6 is to be arranged between the light guide 4 and the substrate surface so as to emit the light in the normal direction of the substrate surface. Such configuration facilitates mounting and is more compact in terms of configuration than the configuration of installing the light emitting portion 6 so as to emit the light parallel to the substrate surface. This is because the general configuration of the light emitting portion 6 is such that the size in the direction perpendicular to the direction of emitting light is greater than the size in the direction of emitting light. Furthermore, application can be made even to a configuration using the planar mounting light emitting element in which the electrode and the light emitting portion are in the same plane.

The optical path conversion mirror 4A has the following effects by being inclined with respect to the light transmitting direction of the light guide 4.

According to the above configuration, the light emitting element can be arranged in the transverse direction with respect to the light transmitting direction. For instance, if the film light guide needs to be arranged parallel to the substrate surface, the light source is to be arranged between the film light guide and the substrate surface so as to emit the light in the normal direction of the substrate surface. Such configuration facilitates mounting and is more compact in terms of configuration than the configuration of installing the light emitting element so as to emit the light parallel to the substrate surface.

The optical module 1 of the present embodiment has a configuration of guiding the signal propagated through the light guide 4 to the light receiving portion 8 by reflecting at the light exit surface 4B (i.e., configuration of using the light exit surface 4B as a reflection surface for converting the optical path), but the configuration of the optical module 1 is not limited to such configuration, and any configuration that enables the signal light exit from the light exit surface 4B to be received by the light receiving portion 8 may be adopted. The light guide 4 may have a configuration in which the light exit surface 4B does not function as the reflection surface, and the signal light is exit in the light transmitting direction from the light exit surface 4B. In this case, the light receiving portion 8 has the light receiving surface arranged in a direction perpendicular to the substrate surface (i.e., direction perpendicular to the light transmitting direction) so as to receive the signal light exit in the light transmitting direction from the light exit surface 4B.

The present invention has been described with the number of cores as one, but similar effects can be obtained even with an array structure in which the core is two or more. For instance, in the bi-directional communication, the configuration with two or more cores is preferable. In the configuration with two or more cores, the amount of loss of the signal light can be stably controlled by having the shape of the optical path conversion mirror with respect to each core.

(Configuration of Light Guide)

FIGS. 1(a) and 1(b) show a schematic configuration of the light guide according to the present embodiment, where FIG. 1(a) is a perspective view and FIG. 1(b) is a perspective view showing only the configuration of the core. In FIGS. 1(a) and 1(b), assuming the surface on the light emitting portion 6 side of the light guide 4 as the bottom surface, the normal direction of the bottom surface is the Y-direction (height direction), and the light transmitting direction is the Z-direction. The direction perpendicular to the Y-direction and the Z-direction is the X-direction (width direction).

As shown in FIG. 1(a), the light guide 4 is configured to include a column-shaped core 10 having the light transmitting direction (Z-direction) serving as the longitudinal direction as an axis, and a clad 11 arranged to surround the periphery of the core 10. The core 10 and the clad 11 are made of material having translucency, and the index of refraction of the core 10 is higher than the index of refraction of the clad 11. The signal light that entered the core 10 is transmitted in the light transmitting direction by repeating total reflection inside the core 10.

The material configuring the core 10 and the clad 11 includes glass, plastic, and the like, but resin material of acryl, epoxy, urethane, silicone, and the like is preferably used to configure the light guide 4 having sufficient flexibility. The clad 11 may be made of gas such as air. Furthermore, similar effects can be obtained even if the clad 11 is used under an environment of liquid having smaller index of refraction than the core 10. The cross-sectional shape of the core 10 at the plane perpendicular to the light transmitting direction is a rectangle.

The cross-sectional shape of the core 10 at the plane perpendicular to the light transmitting direction is not limited to a rectangle. It may be a circle or a polygon such as a triangle. However, the cross-sectional shape of the core 10 at the plane perpendicular to the light transmitting direction is preferably such that the length in the width direction (X-direction) is longer than the length in the height direction (Y-direction) for the following reasons.

The thickness in the height direction of the light guide needs to be thinned to enhance the bending property of the light guide. However, the area occupying the core in the cross-sectional shape at the plane perpendicular to the light transmitting direction becomes small with thinning of the thickness of the light guide. The irradiation area of the signal light from the light emitting portion 6 in the core also becomes small. As a result, the coupling efficiency of the light emitting portion 6 and the light guide 4 lowers. If the cross-sectional shape of the core 10 at the plane perpendicular to the light transmitting direction is formed such that the length in the width direction (X-direction) is longer than the length in the height direction (Y-direction), the area of the core necessary for the optical coupling with the light emitting portion 6 can be ensured and the coupling efficiency can be enhanced even if the thickness of the light guide is thinned.

As shown in FIG. 1(b), the optical path conversion mirror 4A of the core 10 is a surface formed so that the inclination angle α with respect to the bottom surface of the light guide 4 differs in the width direction (X direction) of the light guide 4. Such surface is called the twisted surface.

In the light guide of the present embodiment, a reflection plate such as a metal mirror may be arranged on the optical path conversion mirror 4A of the core 10 formed as the twisted surface. The signal light from the light emitting portion 6 then can be efficiently reflected at the optical path conversion mirror 4A.

The "optical path conversion mirror portion" refers to the end of the light guide 4 where at least the optical path conversion mirror 4A of the core 10 is formed. Thus, the "optical path conversion mirror portion" also includes the configuration in which the optical path conversion mirror 4A is formed in the clad 11, similar to the core 10.

The configuration shown in FIG. 1(b) is a configuration in which the optical path conversion mirror 4A of both the core 10 and the clad 11 is a twisted surface. However, the configuration of the optical path conversion mirror 4A of the light guide 4 is not particularly limited as long as it is a configuration in which the optical path conversion mirror 4A of the core 10 is a twisted surface. For instance, as shown in FIG. 1(c), a configuration in which the optical path conversion mirror 4A of the clad 11 is not a twisted surface, and only the optical path conversion mirror 4A of the core 10 is a twisted surface may be adopted.

(Regarding Optical Path Conversion Mirror 4A of the Core 10)

Figure 4:
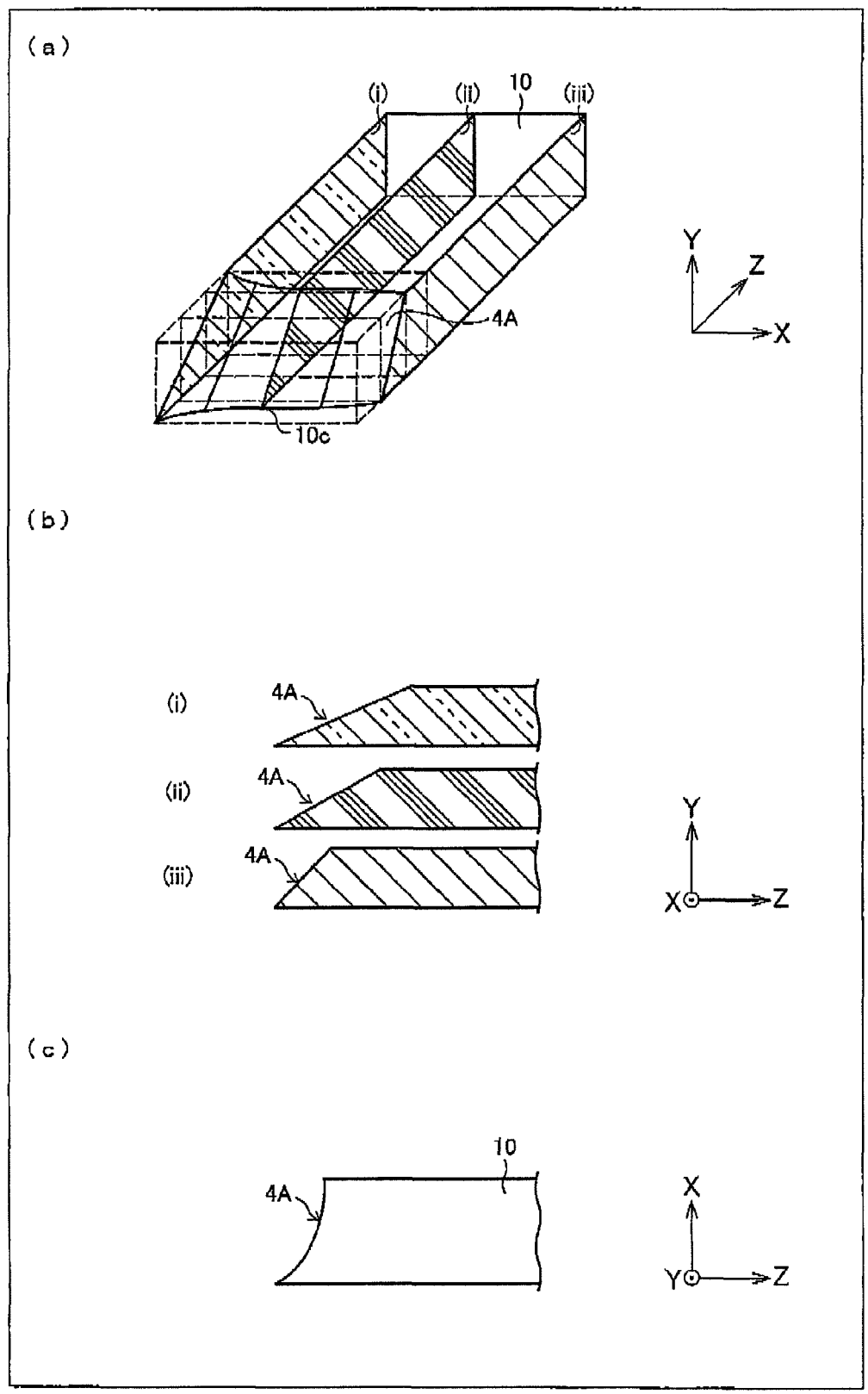
FIGS. 4($a$) to 4($c$) show a configuration of the core of the light guide of FIG. 1, where FIG. 4($a$) is a perspective view, FIG. 4($b$) is a cross-sectional view showing the cross-sectional shape of the core at a plane perpendicular to the width direction (X direction), and FIG. 4($c$) is a cross-sectional view showing the cross-sectional shape of the core at a plane perpendicular to the height direction (Y direction).

The optical path conversion mirror 4A of the core 10 is a twisted surface in the light guide 4 of the present embodiment. The twisted surface will be described below based on FIGS. 4(a) to 4(c). FIGS. 4(a) to 4(c) show a configuration of the core 10 of the light guide 4, where FIG. 4(a) is a perspective view, FIG. 4(b) is a cross-sectional view showing the cross-sectional shape of the core 10 at a plane perpendicular to the width direction (X direction), and FIG. 4(c) is a cross-sectional view showing the cross-sectional shape of the core 10 at a plane perpendicular to the height direction (Y direction).

In FIGS. 4(a) and 4(b), the side surface shape on the left side in the width direction of the core 10 is assumed as shape (i), the cross-sectional shape of the core 10 at a plane passing the central part 10C in the width direction and being perpendicular to the width direction is assumed as shape (ii), and the side surface shape on the right side in the width direction of the core 10 is assumed as shape (iii). The inclination angle of the optical path conversion mirror 4A in the shape (i) is assumed as $\alpha_r$, the inclination angle of the optical path conversion mirror 4A in the shape (ii) is assumed as $\alpha_c$, and the inclination angle of the optical path conversion mirror 4A in the shape (iii) is assumed as $\alpha_l$.

As shown in FIG. 4(b), the inclination angles $\alpha_r$, $\alpha_c$, and $\alpha_l$ are different angles in the optical path conversion mirror 4A of the core 10. Specifically, following is satisfied: inclination angle $\alpha_r$<inclination angle $\alpha_c$<inclination angle $\alpha_l$. Furthermore, the optical path conversion mirror 4A is curved when cut at a plane perpendicular to the height direction (Y direction), as shown in FIG. 4(c).

Figure 5:
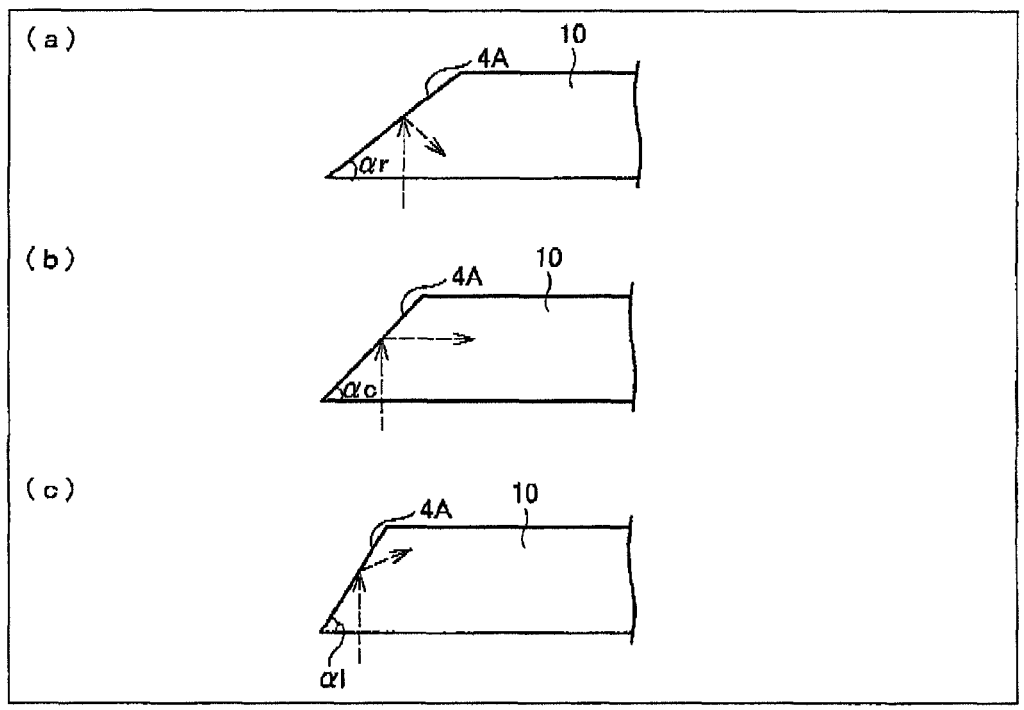
FIG. 5($a$) is an explanatory view showing the signal light propagating direction after reflection in the shape (i) of FIG. 4($c$), FIG. 5($b$) is an explanatory view showing the signal light propagating direction after reflection in the shape (ii) of FIG. 4($c$), and FIG. 5($c$) is an explanatory view showing the signal light propagating direction after reflection in the shape (iii) of FIG. 4($c$).

The effects of having the optical path conversion mirror 4A as a twisted surface will be described below. FIGS. 5(a) to 5(c) are schematic views showing the signal light propagating direction after the signal light is entered to the optical path conversion mirror 4A, which is a twisted surface, and reflected, where FIG. 5(a) shows the signal light propagating direction after reflection in the shape (i) of FIG. 4(c), FIG. 5(b) shows the signal light propagating direction after reflection in the shape (ii) of FIG. 4(c), and FIG. 5(c) shows the signal light propagating direction after reflection in the shape (iii) of FIG. 4(c).

Figure 30:
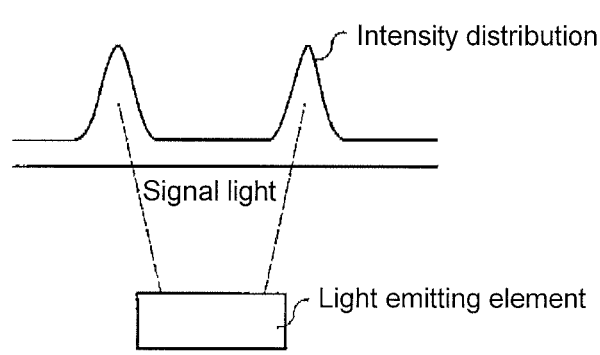
FIG. 30 is an explanatory view schematically showing an intensity distribution of the signal light emitted from the light emitting portion of multi-mode.

When the signal light having the intensity distribution shown in FIG. 30 enters the optical path conversion mirror 4A serving as the twisted surface, one of the two peak lights in the intensity distribution of FIG. 30 is reflected at the optical path conversion mirror 4A (inclination angle $\alpha_r$) of shape (i), and the other is reflected at the optical path conversion mirror 4A (inclination angle $\alpha_l$) of shape (iii). The signal light distributed to the central part of the intensity distribution as in FIG. 30 is reflected at the optical path conversion mirror 4A (inclination angle $\alpha_c$) of shape (ii).

As shown in FIG. 5(a), in the shape (i) (inclination angle $\alpha_r$), the peak light is reflected at the optical path conversion mirror 4A, and then propagated towards the bottom surface side of the light guide. As shown in FIG. 5(b), in the shape (ii) (inclination angle $\alpha_c$), the peak light is reflected at the optical path conversion mirror 4A, and then propagated in the light transmitting direction. As shown in FIG. 5(c), in the shape (iii) (inclination angle $\alpha_l$), the peak light is reflected at the optical path conversion mirror 4A, and then propagated towards the upper surface side of the light guide. Therefore, the two peak lights become light propagated towards the upper surface side of the light guide and light propagated towards the bottom surface side of the light guide by being reflected at the twisted surface.

Figure 6:
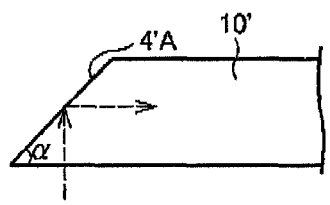
FIG. 6 is an explanatory view showing the signal light propagating direction after reflection at the optical path conversion mirror of the conventional light guide.

In the conventional light guide, on the other hand, the inclination angle α of the optical path conversion mirror is constant without changing in the width direction (optical path conversion mirror is not a twisted surface). Thus, as shown in FIG. 6, two peak lights are propagated in the light transmitting direction after being reflected at the optical path conversion mirror 4'A. Therefore, in the conventional light guide, the two peak lights are less likely to be reflected at the portion near the optical path conversion mirror 4'A in the core 10 and are reflected at the portion relatively spaced apart from the optical path conversion mirror 4'A.

Generally, in the light guide, the signal light propagates through the core with the optical path width (width in the X direction) thereof spreading. Thus, the signal light in which the optical path width is spread and the intensity distribution is uniformed is obtained the longer the guiding distance (optical path length) of the signal light propagating through the core. In the light guide of the present embodiment, the two peak lights do not have the reflecting direction at the optical path conversion mirror 4A parallel to the light transmitting direction (Z direction), and become the light propagated towards the upper surface side of the light guide and the light propagated towards the bottom surface side of the light guide by the effect of the twisted surface. Thus, even if the core length in the Z direction from the optical path conversion mirror is the same, the number of reflections at the side surface of the core in the Z-axis direction becomes greater in the light guide of the present embodiment compared to the conventional light guide. Accompanied therewith, the guiding distance (optical path length) of the signal light in the Z-axis direction becomes longer. As a result, in the light guide of the present embodiment, the two peak lights (signal light) have an optical path width sufficient for the intensity distribution to become uniform in the vicinity of the optical path conversion mirror compared to the conventional light guide. In other words, in the light guide of the present embodiment, the intensity distribution of the signal light after being reflected at the optical path conversion mirror is uniformed faster than in the conventional light guide.

As shown in FIG. 4(c), the optical path conversion mirror 4A is curved when cut at a plane perpendicular to the height direction (Y direction) at the core of the light guide of the present embodiment. In other words, the optical path conversion mirror 4A is a surface inclined with respect to the X direction in the cross-sectional shape perpendicular to the height direction (Y direction). As the optical path conversion mirror 4A is a surface inclined with respect to the X direction, a long guiding distance (optical path length) can be ensured.

Figure 7:
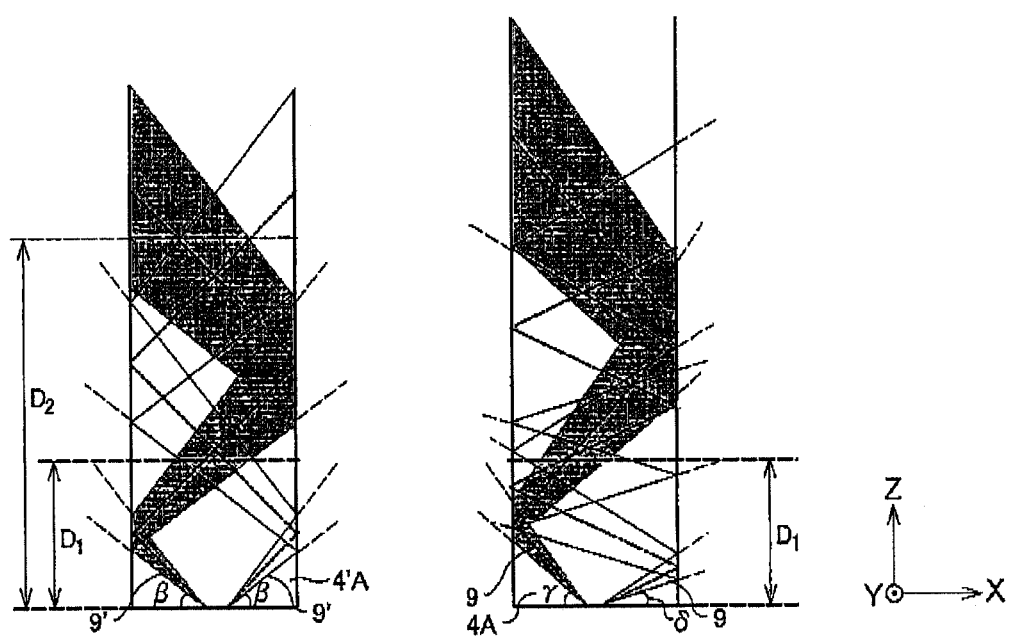
FIG. 7 is a schematic view showing the optical path of the peak light in the core after reflection at the optical path conversion mirror, where a solid line shows the optical path in the light guide in which the optical path conversion mirror is formed as a twisted surface and a dotted line shows the optical path in the conventional light guide in which the inclination angle α of the optical path conversion mirror is uniform in the width direction.

FIGS. 7(a) and 7(b) are views showing the optical path of the peak light in the core after reflection at the optical path conversion mirror, where FIG. 7(a) shows the optical path in the conventional light guide in which the inclination angle α of the optical path conversion mirror is uniform in the width direction, and FIG. 7(b) shows the optical path in the light guide in which the optical path conversion mirror is formed as a twisted surface. FIGS. 7(a) and 7(b) show the optical path at the plane perpendicular to the height direction (Y direction). The conventional configuration and the configuration of the present embodiment are different in the cross-sectional shape of the core at the plane perpendicular to the height direction (Y direction), but are formed as a same shape for simplification in FIGS. 7(a) and 7(b).

As shown in FIG. 7(a), the two peak lights 9' in the core of the conventional light guide are both reflected at the reflection angle β at the optical path conversion mirror 4'A, and interfered at a position distant by distance $D_1$ in the Z-direction from the optical path conversion mirror 4'A. At such position, the two peak lights 9' have short guiding distance (optical path length), and the optical path width is insufficient for the intensity distribution to uniform. Thus, in the core of the conventional light guide, the intensity distribution of the signal light at the position distant by distance $D_1$ in the Z-direction from the optical path conversion mirror 4'A is not uniform. The intensity distribution of the two peak lights 9' become uniform at the position distant by distance $D_2$ in the Z-direction from the optical path conversion mirror 4'A.

In the core of the light guide of the present embodiment, the optical path conversion mirror 4A is a surface inclined with respect to the X-direction. Thus, as shown in FIG. 7(b), the two peak lights 9 respectively become light reflected at the reflection angle γ with respect to the X-direction and light reflected at the reflection angle δ with respect to the X-direction by the optical path conversion mirror 4A. Thus, even if the core length in the Z-direction from the optical path conversion mirror is the same, the number of reflections at the side surface of the core in the X-direction becomes greater in the light guide of the present embodiment than in the conventional light guide. The guiding distance (optical path length) of the signal light in the X-direction thus becomes long. Therefore, as shown in FIG. 7(b), in the light guide of the present embodiment, the two peak lights 9 (signal light) already have an optical path width sufficient for the intensity distribution to uniform at the position distant by distance $D_1$ in the Z-direction from the optical path conversion mirror 4A in the vicinity of the optical path conversion mirror.

Therefore, since the optical path conversion mirror 4A of the light guide of the present embodiment is a surface inclined with respect to the X-direction, the intensity distribution of the signal light can be uniformed faster than with the optical path conversion mirror 4'A of the conventional light guide.

Figure 8:
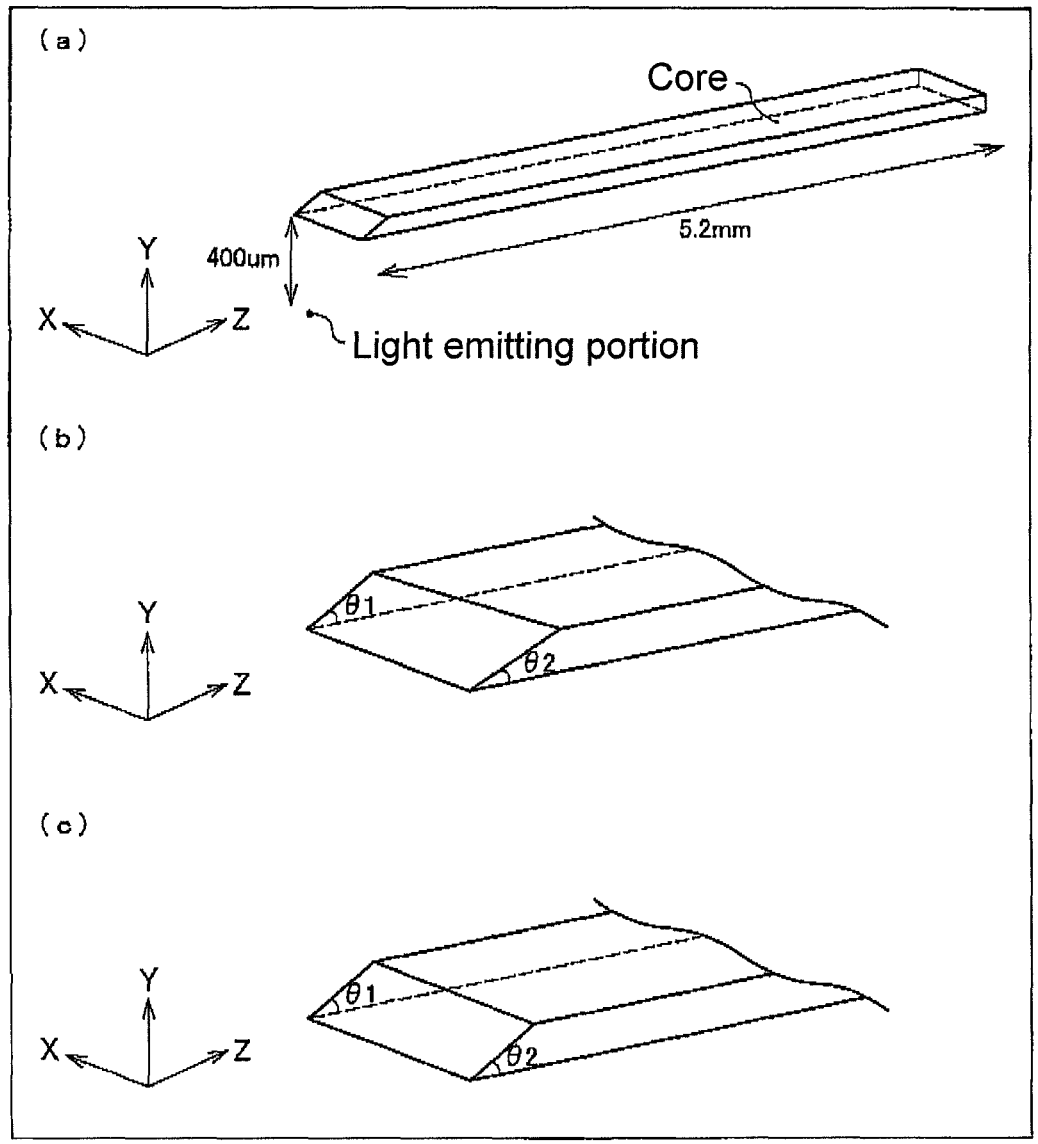
FIGS. 8($a$) to 8($c$) show the simulation conditions of the propagation of the peak light for the light guide of the present embodiment and the conventional light guide, where FIG. 8($a$) is an explanatory view showing the simulation condition common to the light guide of the present embodiment and the conventional light guide, FIG. 8($b$) is an explanatory view showing the simulation condition of the optical path conversion mirror serving as the twisted surface in the light guide of the present embodiment.
Figure 9:
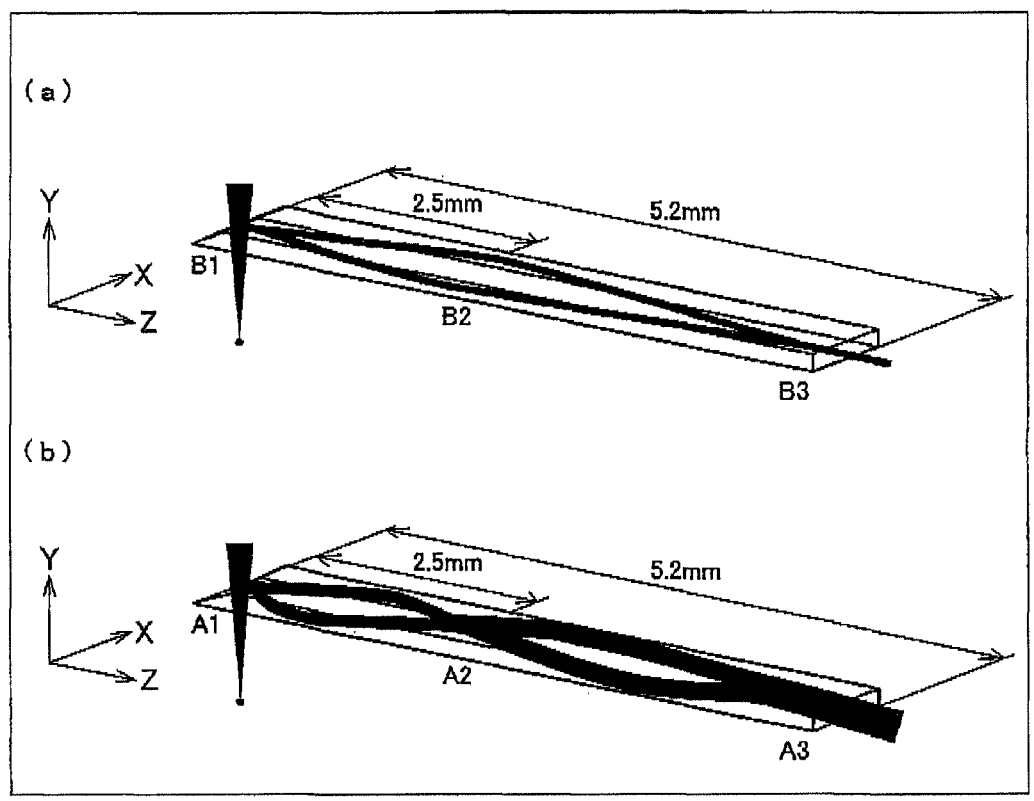
FIG. 9(a) is an explanatory view showing the simulated result for the core in the conventional light guide.
FIG. 9(b) is an explanatory view showing the simulated result for the core in the light guide of the present embodiment.

The result of simulating the propagation of the peak light and comparing the uniforming of the intensity distribution of the signal light and the light collecting area of the peak light will be described for the light guide of the present embodiment and the conventional light guide with reference to FIG. 8 to FIG. 10. FIGS. 8(a) to 8(c) show the simulation conditions of the propagation of the peak light for the light guide of the present embodiment and the conventional light guide, where FIG. 8(a) is an explanatory view showing the simulation condition common to the light guide of the present embodiment and the conventional light guide, FIG. 8(b) is an explanatory view showing the simulation condition of the optical path conversion mirror serving as the twisted surface in the light guide of the present embodiment, and FIG. 8(c) is an explanatory view showing the simulation condition of the optical path conversion mirror in the conventional light guide.

As shown in FIG. 8(a), the simulation conditions common to the light guide of the present embodiment and the conventional light guide are as follows. In other words, the distance between the core and the light emitting portion is 40 μm. A multi-mode light emitting portion (light emitting portion for emitting two peak lights) is used for the light emitting portion. The dimension of the core is such that the length in the width direction (X-direction) is 200 μm, and the length in the height direction (Y-direction) is 40 μm, and the length in the light transmitting direction (Z-direction) is 5.2 mm.

As shown in FIG. 8(b), the simulation condition of the optical path conversion mirror serving as the twisted surface in the light guide of the present embodiment is such that the inclination angle $\theta_1$ (correspond to inclination angle $\alpha_r$) of the optical path conversion mirror at the side surface shape on the right side in the width direction of the core is 49°, and the inclination angle $\theta_2$ (correspond to inclination angle $\alpha_l$) of the optical path conversion mirror at the side surface shape on the left side in the width direction of the core is 41°. As shown in FIG. 8(c), the simulation condition of the optical path conversion mirror in the conventional light guide is inclination angle $\theta_1=\theta_2=45°$.

The result of simulating the propagation of the signal light in the core when the core shown in FIGS. 8(a) to 8(c) is irradiated with the signal light is shown in FIGS. 9(a) and 9(b). FIG. 9(a) is an explanatory view showing the simulated result for the core in the conventional light guide, and FIG. 9(b) is an explanatory view showing the simulated result for the core in the light guide of the present embodiment.

As shown in FIG. 9(a), in the conventional light guide, the light collecting area of the peak light in the core is positioned at an area (B3) spaced apart by 5.2 mm in the light transmitting direction (Z-direction) from the optical path conversion mirror, where the peak light is not uniformed at all at the area (B2) spaced apart by 2.5 mm. As shown in FIG. 9(b), in the light guide of the present embodiment, the interfering area of the peak light is positioned at the area (A2) spaced apart by 2.5 mm in the light transmitting direction (Z-direction) from the optical path conversion mirror (position of about half of the conventional light guide) although the state of peak light (state of peak light at area B1) when entering the optical path conversion mirror is the same as in the conventional light guide.

In the conventional light guide shown in FIG. 9(a), the reflection of the two peak lights occurs once at the distance 5.2 mm between the areas B1 and B3 of the core. In the light guide of the present embodiment shown in FIG. 9(b), the reflection of the two peak lights is repeated twice at the distance 5.2 mm between the areas A1 and A3 of the core. Thus, the guiding distance (optical path length) of the two peak lights is longer in the light guide of the present embodiment than in the conventional light guide. The peak light is sufficiently uniformed at the area (A3) spaced apart by 5.2 mm in the light transmitting direction (Z-direction) from the optical path conversion mirror.

Figure 10:
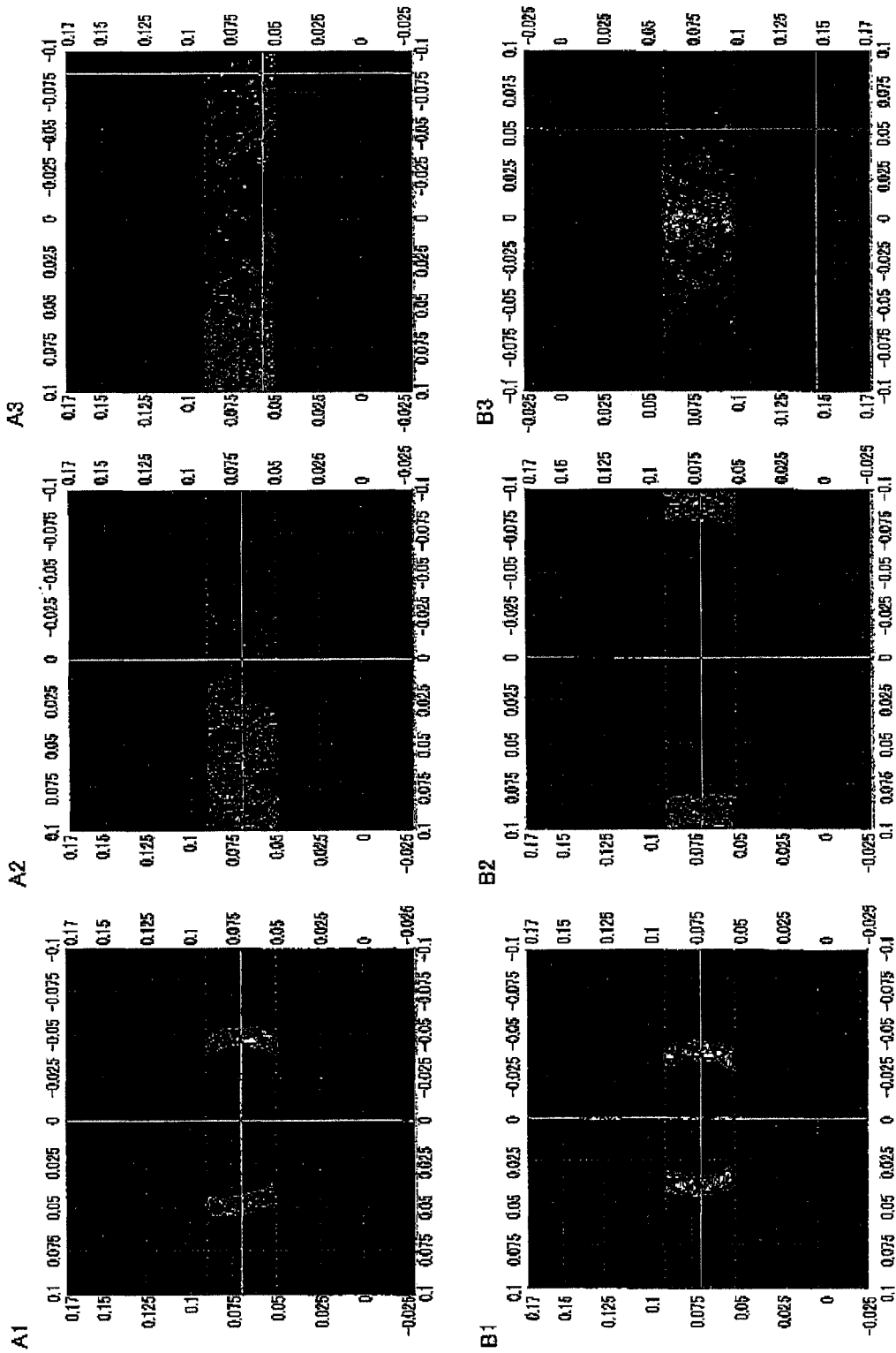
FIG. 10 is a graph showing the profile (intensity distribution) of the signal light in the core at the areas A1 to A3 and the areas B1 to B3 shown in FIGS. 9(a) and 9(b).

FIG. 10 is a graph showing the profile (intensity distribution) of the signal light in the core at the areas A1 to A3 (light guide of the present embodiment) and the areas B1 to B3 (conventional light guide) shown in FIGS. 9(a) and 9(b). As shown in the figure, the intensity distribution of the signal light is already uniformed at the area A3 of the core in the light guide of the present embodiment. The peak lights are interfered at the area A3 of the core, and the intensity distribution of the signal light is not uniformed in the conventional light guide.

Therefore, the loss of signal light becomes large since the peak lights are interfered at the central part of the core at the area A3 when bend and twist are applied at the area A3 of the core of the conventional light guide. That is, in the conventional light guide, the loss of signal light when the bend and twist are applied at the area A3 of the core becomes significantly greater than the loss of light when the bend and twist are applied at other than the area A3. Thus, in the conventional light guide, the loss of signal light by the bend and twist becomes difficult to stabilize in the light transmitting direction (Z-direction) of the light guide, and areas where the loss of signal light greatly differs exist depending on the bent and twisted area. Therefore, in the conventional light guide, the loss of signal light with respect to the bend and the twist in the region near the optical path conversion mirror becomes difficult to stably control.

Generally, the possibility the bend and twist occur is low since the core in the vicinity of the optical path conversion mirror is fixed by a mounting substrate, where the light guide mounts the light emitting portion. Therefore, if the intensity distribution of the signal light can be uniformed at the area of the core close to the optical path conversion mirror, the amount of loss of the signal light with respect to the bend and twist can be stably controlled in the light transmitting direction (Z-direction) compared to the conventional configuration. In the light guide of the present embodiment, the optical path conversion mirror is formed as a twisted surface where the inclination angle differs in the width direction (X-direction), and thus the intensity distribution of the signal light in the core can be uniformed more on the optical path conversion mirror side compared to the conventional configuration.

Thus, a light guide capable of stably controlling the amount of loss of the signal light with respect to bend and twist in the region near the optical path conversion mirror can be realized.

(Regarding Inclination Angle $\alpha$ of Optical Path Conversion Mirror 4A)

The inclination angle $\alpha$ of the optical path conversion mirror 4A of the core 10 in the light guide 4 of the present embodiment will now be specifically described below.

Figure 11:
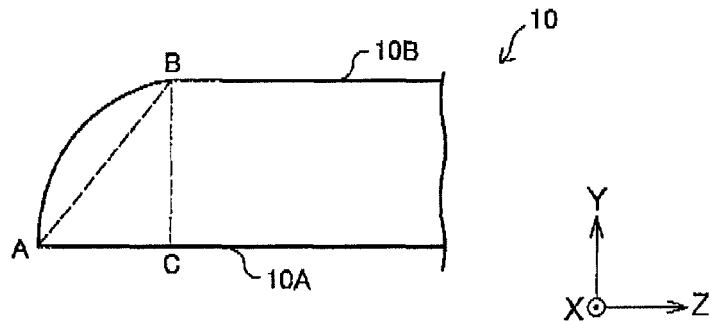
FIG. 11 is an explanatory view describing the definition of the "inclination angle α" in the present invention.

First, "inclination angle $\alpha$" refers to an angle inclined with respect to the longitudinal direction (Z-direction) of the light guide. The optical path conversion mirror 4A of the core 10 inclined with respect to the longitudinal direction (Z-direction) of the light guide is not limited to a plane, and may be a curved surface having a predetermined curvature radius as described in the variants below. FIG. 11 is an explanatory view describing the definition of the "inclination angle $\alpha$".

First, as shown in FIG. 11, the surface on the light emitting portion side of the core 10 is a bottom surface 10A and a surface on the opposite side of the light emitting portion is the upper surface 10B in the cross-sectional shape at the plane perpendicular to the width direction (X-direction) of the core 10. The cross-sectional shape is shown in FIG. 11, and thus the bottom surface 10A and the upper surface 10B are shown as a line. The optical path conversion mirror 4A is also shown as a line, similar to the bottom surface 10A and the upper surface 10B.

In the present embodiment, the "inclination angle $\alpha$" can be defined as below. In other words, the "inclination angle $\alpha$" can be defined as an inclination angle with respect to the longitudinal direction (Z-direction) of a virtual line AB connecting point A and point B, where point A is the area where the optical path conversion mirror 4A and the bottom surface 10A are coupled, and point B is the area where the optical path conversion mirror 4A and the upper surface 10B are coupled.

The range of change in the width direction of the inclination angle $\alpha$ of the optical path conversion mirror 4A may be any range as long as the maximum inclination angle is in a range the incident angle of the signal light applied from the light emitting portion 6 with respect to the optical path conversion mirror 4A does not exceed the critical angle. The signal light is transmitted without being totally reflected in the core 10 and becomes a loss if the inclination angle $\alpha$ is set in a range the incident angle of the signal light applied from the light emitting portion 6 does not exceed the critical angle.

Therefore, the range of the inclination angle $\alpha$ of the optical path conversion mirror 4A and the light exit surface 4B of the core 10 is preferably set such that the maximum inclination angle is set to $\alpha_c+1$ to 3° and the minimum inclination angle is set to $\alpha_c-1$ to 3°, where $\alpha_c$ is the inclination angle of the optical path conversion mirror 4A in the cross-sectional shape of the core 10 at the plane perpendicular to the width direction at the central part in the width direction. The inclination angle $\alpha_c$ is preferably set between 40° and 50°.

The configuration in which the inclination angle with respect to the longitudinal direction (Z-direction) differs in the width direction (X-direction) can also be represented as below with reference to FIG. 11.

In other words, the configuration of the light guide of the present embodiment is such that one end (point A) and the other end (point B) in the height direction (Y-direction) are spaced apart in the longitudinal direction (Z-direction), and the distance thereof differs in the width direction (X-direction).

In FIG. 11, assuming the intersection of a line passing through point B and being perpendicular to the bottom surface 10A and the bottom surface 10A is point C, the distance between point A and point C is a spaced distance between point A and point B in the longitudinal direction (Z-direction). The configuration of the light guide of the present embodiment is thus a configuration in which the distance between point A and point C differs in the width direction (X-direction).

(Variant 1)

Figure 12:
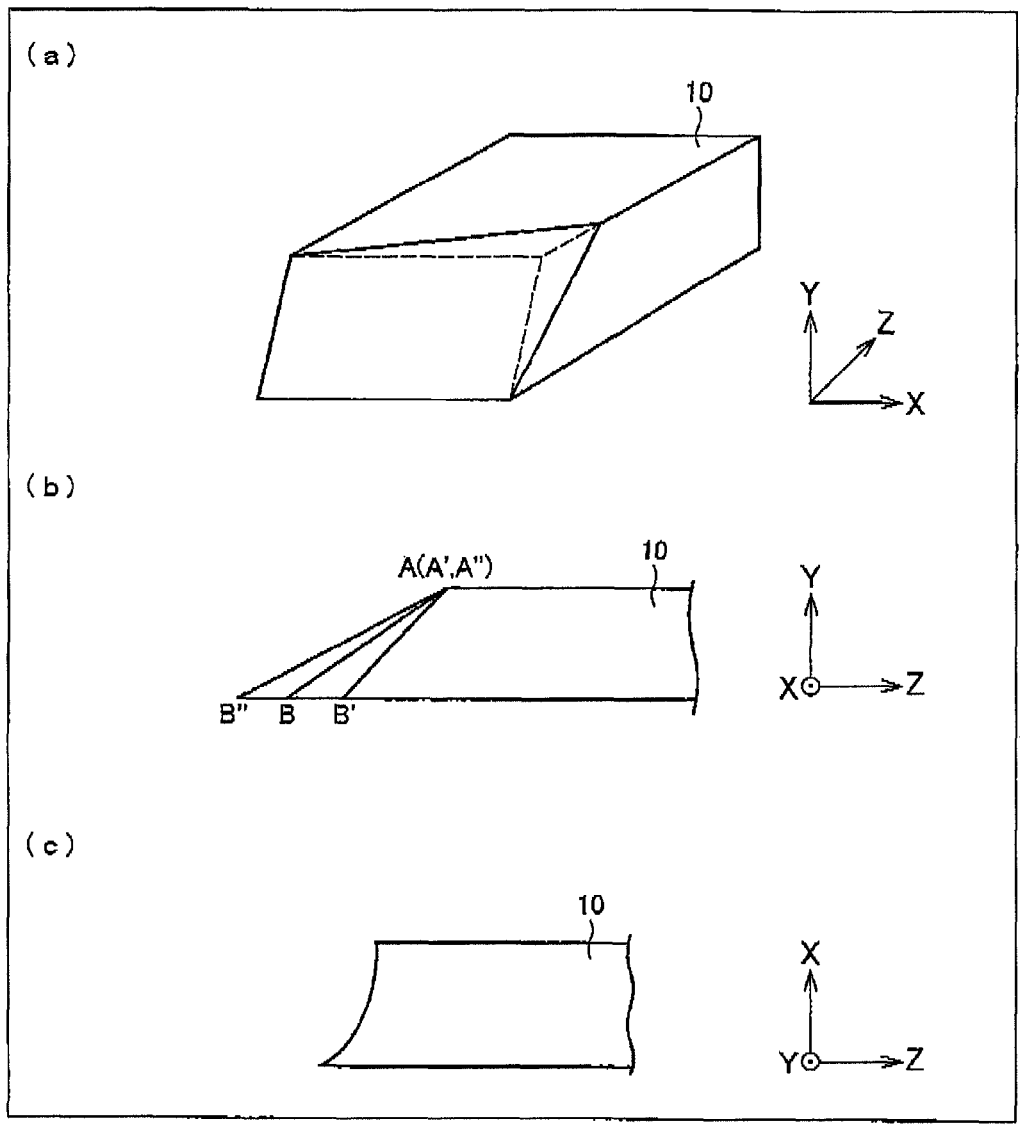
FIG. 12(a) is a perspective view of the core of the light guide serving as variant 1.
FIG. 12(b) is a cross-sectional view showing a cross-sectional shape at a plane perpendicular to the width direction (X-direction)
FIG. 12(c) is a cross-sectional view showing a cross-sectional shape at a plane perpendicular to the height direction (Y-direction).

A variant of the configuration shown in FIG. 1 will be described in the configuration of the light guide 4 of the present embodiment. FIG. 12(a) is a perspective view of the core 10 of the light guide 4 serving as variant 1, FIG. 12(b) is a cross-sectional view showing a cross-sectional shape at a plane perpendicular to the width direction (X-direction), and FIG. 12(c) is a cross-sectional view showing a cross-sectional shape at a plane perpendicular to the height direction (Y-direction). In the cross-sectional view of FIG. 12(b), line AB indicates the optical path conversion mirror in the cross-sectional shape of the core 10 at the plane passing through the central part in the width direction and being perpendicular to the width direction, and line A'B' and line A"B" show the optical path conversion mirror in the side surface shape on the left side in the width direction of the core 10 and the optical path conversion mirror in the side surface shape on the right side in the width direction of the core 10, respectively.

As shown in the figure, in variant 1, the line AB, the line A'B', and the line A"B" serving as the optical path conversion mirror intersect at one point in the cross-sectional shape at the plane perpendicular to the width direction (X-direction) of the core 10. The intersection of the line AB, the line A'B', and the line A"B" is also a starting point of the transition in the width direction of the inclination angle α of the optical path conversion mirror 4A. In variant 1, the intersection of the line AB, the line A'B', and the line A"B" is arranged on the upper side than the central part in the height direction of the core.

(Variant 2)

Figure 13:
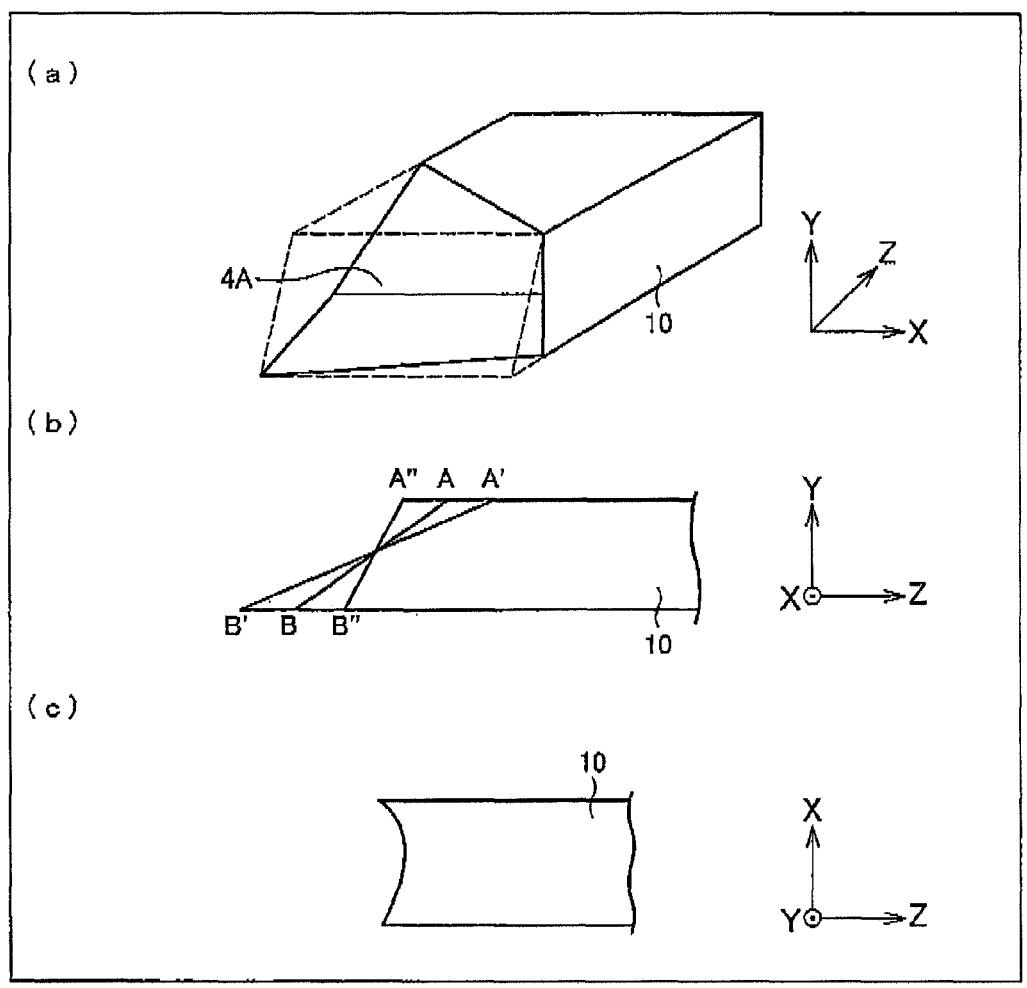
FIG. 13(a) is a perspective view of the core of the light guide serving as variant 2.
FIG. 13(b) is a cross-sectional view showing a cross-sectional shape at a plane perpendicular to the width direction (X-direction)
FIG. 13(c) is a cross-sectional view showing a cross-sectional shape at a plane perpendicular to the height direction (Y-direction).

A variant of the configuration shown in FIG. 1 will be described in the configuration of the light guide 4 of the present embodiment. FIG. 13(a) is a perspective view of the core 10 of the light guide 4 serving as variant 2, FIG. 13(b) is a cross-sectional view showing a cross-sectional shape at a plane perpendicular to the width direction (X-direction), and FIG. 13(c) is a cross-sectional view showing a cross-sectional shape at a plane perpendicular to the height direction (Y-direction). In the cross-sectional view of FIG. 13(b), the line AB indicates the optical path conversion mirror in the cross-sectional shape of the core 10 at the plane passing through the central part in the width direction and being perpendicular to the width direction, and line A'B' and line A"B" show the optical path conversion mirror in the side surface shape on the left side in the width direction of the core 10 and the optical path conversion mirror in the side surface shape on the right side in the width direction of the core 10, respectively.

As shown in the figure, variant 2 has a configuration in which the line AB, the line A'B', and the line A"B" serving as the optical path conversion mirror intersect at one point in the cross-sectional shape at the plane perpendicular to the width direction (X-direction) of the core 10. In variant 2, the intersection of the line AB, the line A'B', and the line A"B" is arranged at the central part in the height direction of the core.

(Variant 3)

Figure 14:
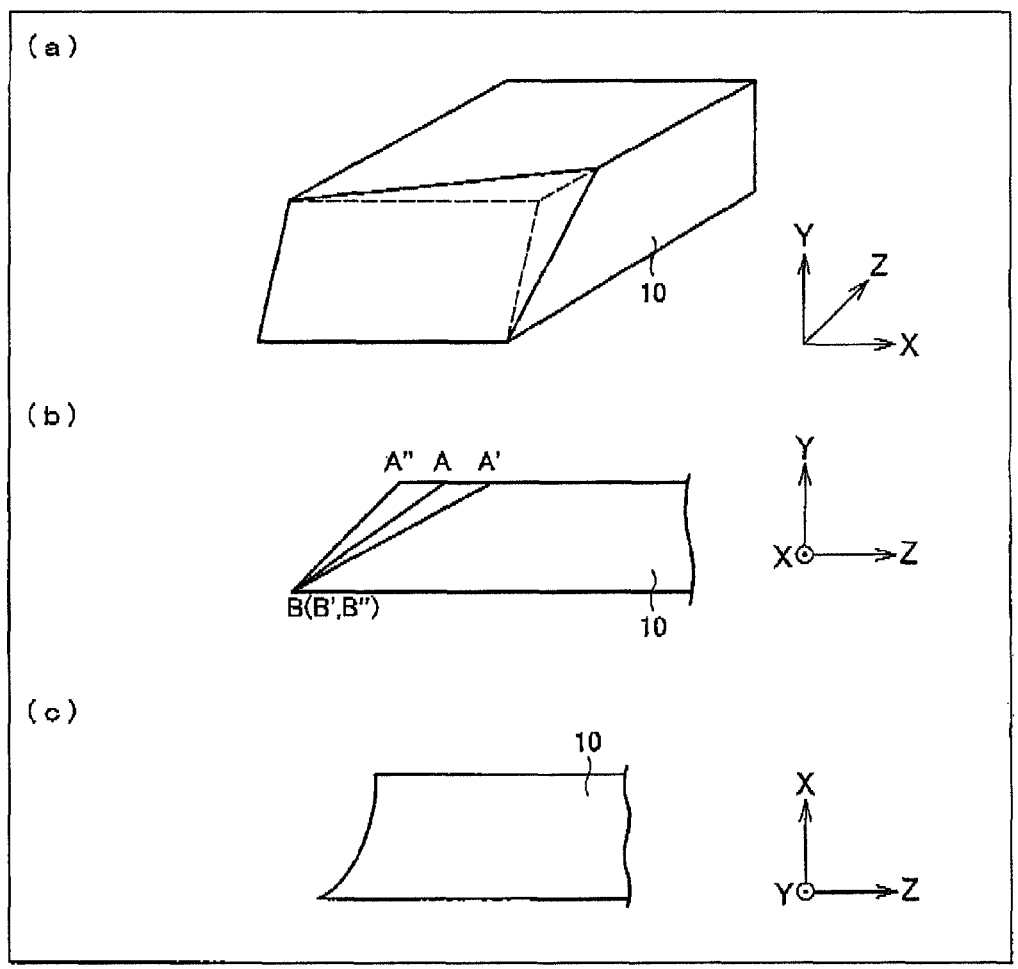
FIG. 14(a) is a perspective view of the core of the light guide serving as variant 3.
FIG. 14(b) is a cross-sectional view showing a cross-sectional shape at a plane perpendicular to the width direction (X-direction)
FIG. 14(c) is a cross-sectional view showing a cross-sectional shape at a plane perpendicular to the height direction (Y-direction).

A variant of the configuration shown in FIG. 1 will be described in the configuration of the light guide 4 of the present embodiment. FIG. 14(a) is a perspective view of the core 10 of the light guide 4 serving as variant 3, FIG. 14(b) is a cross-sectional view showing a cross-sectional shape at a plane perpendicular to the width direction (X-direction), and FIG. 14(c) is a cross-sectional view showing a cross-sectional shape at a plane perpendicular to the height direction (Y-direction). In the cross-sectional view of FIG. 14(b), the line AB indicates the optical path conversion mirror in the cross-sectional shape of the core 10 at the plane passing through the central part in the width direction and being perpendicular to the width direction, and line A'B' and line A"B" show the optical path conversion mirror in the side surface shape on the left side in the width direction of the core 10 and the optical path conversion mirror in the side surface shape on the right side in the width direction of the core 10, respectively.

As shown in the figure, variant 3 has a configuration in which the line AB, the line A'B', and the line A"B" serving as the optical path conversion mirror intersect at one point in the cross-sectional shape at the plane perpendicular to the width direction (X-direction) of the core 10, similar to variants 1 and 2. In variant 3, the intersection of the line AB, the line A'B', and the line A"B" is arranged on the lower side than the central part in the height direction of the core.

(Variant 4)

Figure 15:
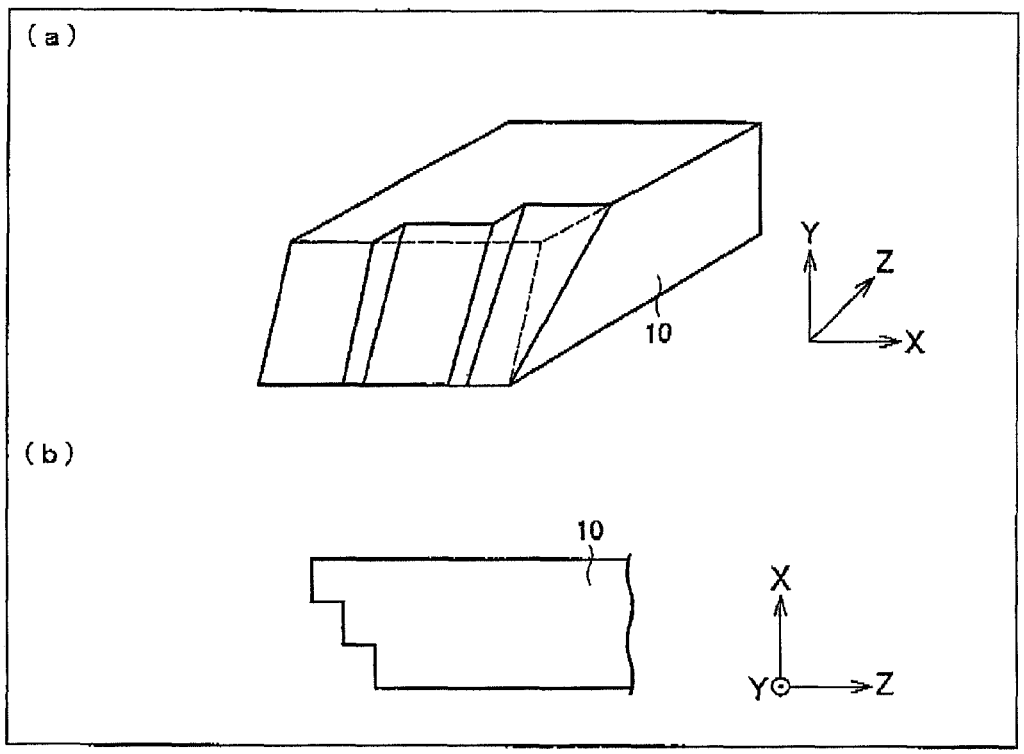
FIG. 15(a) is a perspective view of the core of the light guide serving as variant 4.
FIG. 15(b) is a cross-sectional view showing a cross-sectional shape at a plane perpendicular to the height direction (Y-direction).

A variant of the configuration shown in FIG. 1 will be described in the configuration of the light guide 4 of the present embodiment. FIG. 15(a) is a perspective view of the core 10 of the light guide 4 serving as variant 4, and FIG. 15(b) is a cross-sectional view showing a cross-sectional shape at a plane perpendicular to the height direction (Y-direction). As shown in FIG. 15(b), the optical path conversion mirror 4A may be discontinuously formed (not formed as continuous curved surface) and formed to a step-shape in the width direction (X-direction) in the cross-sectional shape at a plane perpendicular to the height direction (Y-direction) of the core 10.

(Variant 5)

Figure 16:
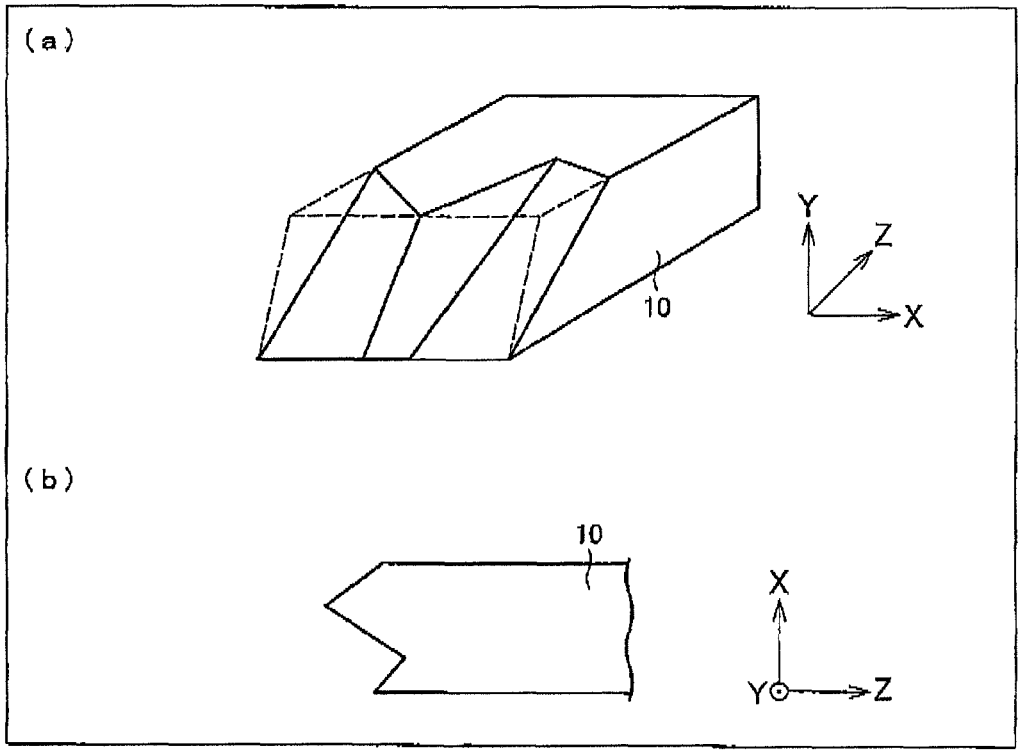
FIG. 16(a) is a perspective view of the core of the light guide serving as variant 5.
FIG. 16(b) is a cross-sectional view showing a cross-sectional shape at a plane perpendicular to the height direction (Y-direction).

A variant of the configuration shown in FIG. 1 will be described in the configuration of the light guide 4 of the present embodiment. FIG. 16(a) is a perspective view of the core 10 of the light guide 4 serving as variant 5, and FIG. 16(b) is a cross-sectional view showing a cross-sectional shape at a plane perpendicular to the height direction (Y-direction). As shown in FIG. 16(b), the optical path conversion mirror 4A may be discontinuously formed (not formed as continuous curved surface) and may have the end face formed to a zigzag shape in the width direction (X-direction) in the cross-sectional shape at a plane perpendicular to the height direction (Y-direction) of the core 10.

(Variant 6)

Figure 17:
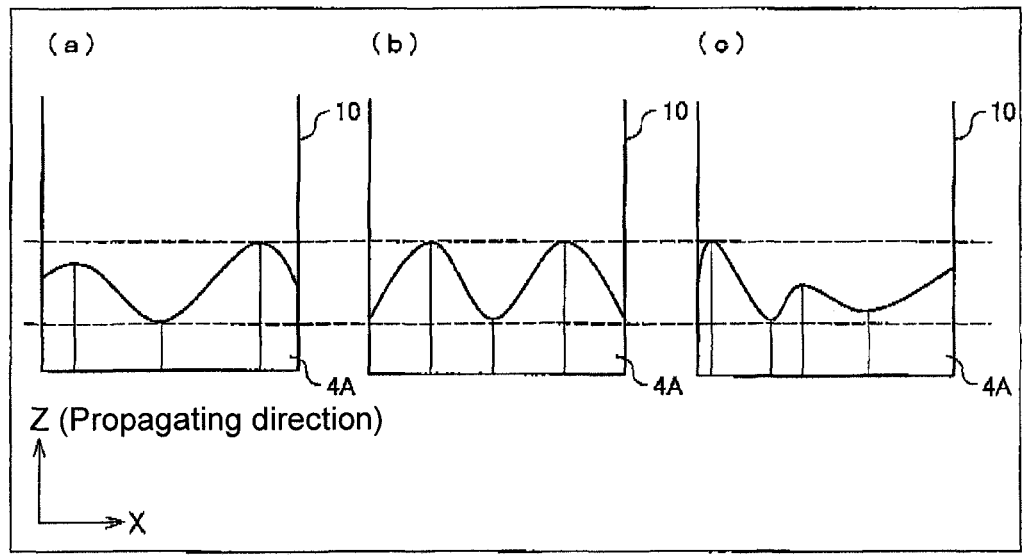
FIGS. 17(a) to 17(c) are top views when seen from the upper side in the height direction (Y-direction) of the core of the light guide serving as variant 6.

A variant of the configuration shown in FIG. 1 will be described in the configuration of the light guide 4 of the present embodiment. FIGS. 17(a) to 17(c) are top views when seen from the upper side in the height direction (Y-direction) of the core 10 of the light guide 4 serving as variant 6. As shown in FIGS. 17(a) to 17(c), the optical path conversion mirror 4A may be discontinuously formed (not formed as continuous curved surface) and may have the end face formed to a waveform shape in the width direction (X-direction) in the top view seen from the upper side in the height direction (Y-direction) of the core 10.

(Variant 7)

Figure 18:
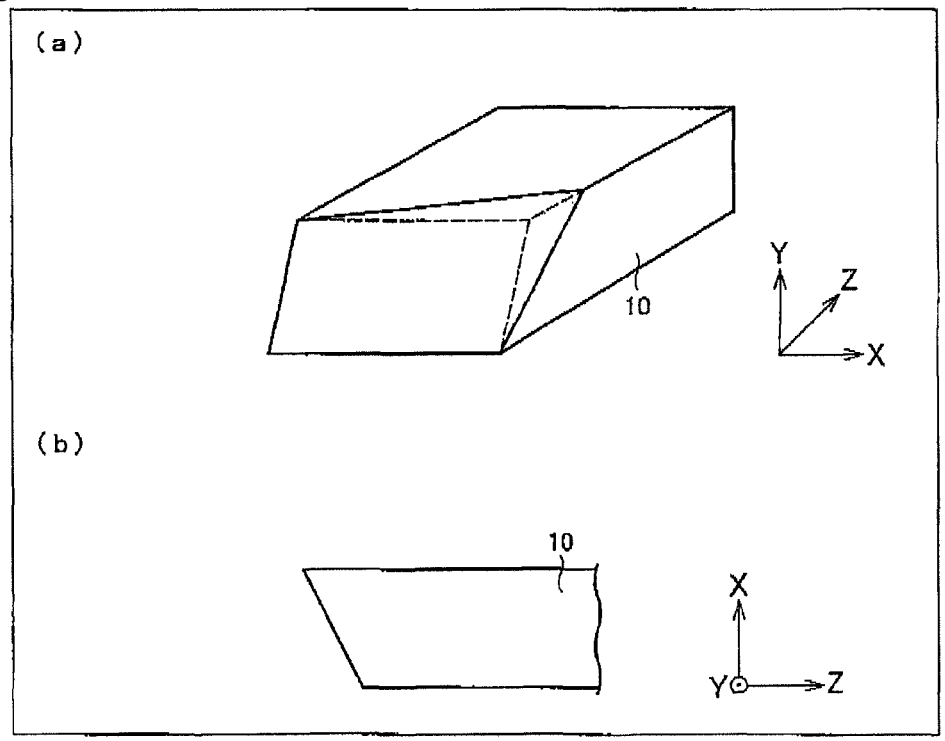
FIG. 18(a) is a perspective view of the core of the light guide serving as variant 7.
FIG. 18(b) is a cross-sectional view showing a cross-sectional shape at a plane perpendicular to the height direction (Y-direction).

A variant of the configuration shown in FIG. 1 will be described in the configuration of the light guide 4 of the present embodiment. FIG. 18(*a*) is a perspective view of the core 10 of the light guide 4 serving as variant 7, and FIG. 18(*b*) is a cross-sectional view showing a cross-sectional shape at a plane perpendicular to the height direction (Y-direction). As shown in FIG. 18(*b*), the optical path conversion mirror 4A may be formed as a line inclined with respect to the side surface in the width direction in the cross-sectional shape at a plane perpendicular to the height direction (Y-direction) of the core 10.

(Effects of the Configurations of Variant 4 to Variant 7)

Figure 19:
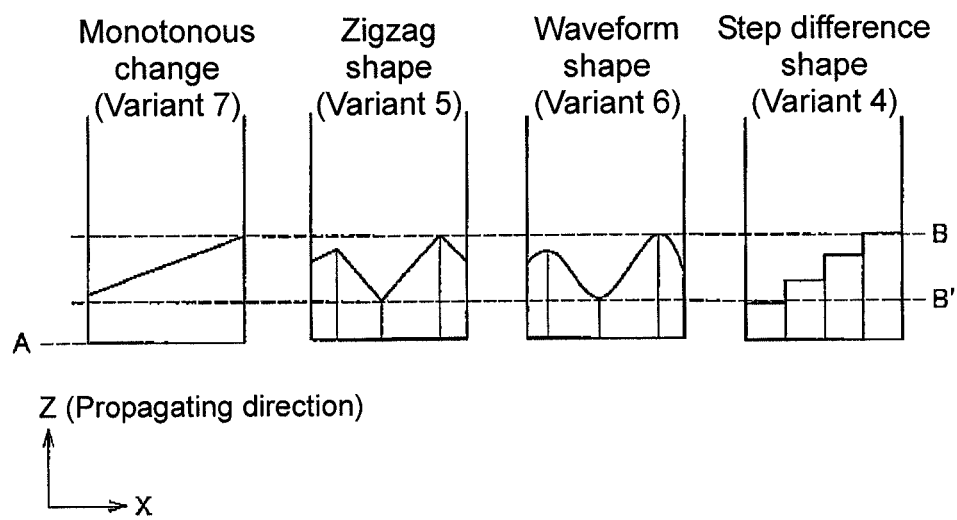
FIG. 19 is a top view showing the configurations of variants 4 to 7 when the maximum value and the minimum value of the spaced distance are the same.

In the configurations of variant 4 to variant 7, the configurations of variants 4 to 6 enable longer guiding distance of the signal light than the configuration of variant 7 if one end (point A) and the other end (point B) in the height direction (Y-direction) are spaced apart in the longitudinal direction (Z-direction), and the maximum value and the minimum value of the spaced distance are the same. FIG. 19 is a top view showing the configurations of variants 4 to 7 when the maximum value and the minimum value of the spaced distance are the same. Point B in FIG. 19 indicates the other end when the spaced distance is a maximum, and point B' indicates the other end when the spaced distance is a minimum.

The configurations of variants 4 to 7 can be implemented using the distribution of the spaced distance AB in the longitudinal direction (Z-direction) with respect to the width direction (X-direction) (hereinafter simply referred to as distribution of the spaced distance AB). In other words, each configuration of variant 4 to 7 can be represented as a configuration in which the distribution of the spaced distance AB is step-difference shape, zigzag shape, waveform shape, and linear having monotonous slope. The configurations of variants 4 to 7 shown in FIG. 19 can be considered configurations in which the maximum value and the minimum value in the distribution of the spaced distance AB are the same.

As shown in FIG. 19, the optical path conversion mirrors of variant 4 to 6 have a steeper inclination angle with respect to the width direction (X-direction) compared to the optical path conversion mirror of variant 7. Thus, the optical path conversion mirrors of variant 4 to 6 can reflect one of the two peak lights in a direction closer to the X-direction than the optical path conversion mirror of variant 7. In other words, the optical conversion mirrors of variants 4 to 6 can have the angle formed by the direction of the peak light reflected from the optical path conversion mirror and the X-direction smaller than the optical path conversion mirror of variant 7 in a plane (XZ plane) perpendicular to the height direction (Y-direction). Thus, in variants 4 to 6, the peak light is reflected at the side surface of the core near the optical path conversion mirror than variant 7, and the number of reflections becomes greater. As a result, the guiding distance of the peak light becomes longer and the intensity distribution of the signal light can be uniformed faster in the configurations of variants 4 to 6 compared to variant 7.

Furthermore, since the peak light has an optical path width, the peak light becomes the light reflected at the step difference change portion (portion extending in the Z-direction) having a step difference shape and the light reflected at other portions when the peak light enters the optical path conversion mirror of variant 4 in which the distribution of the spaced distance AB has a step difference shape. The peak light reflected at the step difference change portion (portion extending in the Z-direction) having a step difference shape is exit in a direction opposite to the direction the light advanced up to the relevant point on the X-axis (e.g., peak light advanced in the + direction of the X-axis up to the relevant point is reflected in the − direction). The peak light reflected other than at the step difference change portion having a step difference shape is exit in a direction same as the direction the light advanced up to the relevant point on the X-axis. Thus, one of the two peak lights is exit in an opposite direction on the X-axis, so that the intensity distribution of the signal light is more uniformed.

In variant 5 or 6 in which the distribution of the spaced distance AB has a zigzag shape or a waveform shape, the peak light is not reflected at the optical path conversion mirror and is transmitted therethrough if the density of the hill (or valley) portion in the zigzag shape or the waveform shape is increased too much. Thus, in variant 5 or 6, the hill (or valley) portion in the zigzag shape or the waveform shape is preferably formed so that the effects of reflection and diffusion of the signal light at the optical path conversion mirror remain.

If the zigzag shape, the waveform shape, or the step difference shape is formed only at the surface of one portion of the optical path conversion mirror, the peak light may enter avoiding the zigzag shape or the waveform shape depending on the intensity distribution of the signal light entering the optical path conversion mirror. Thus, the zigzag shape, the waveform shape, or the step difference shape is preferably formed over the entire surface of the optical path conversion mirror.

(Variant 8)

Figure 20:
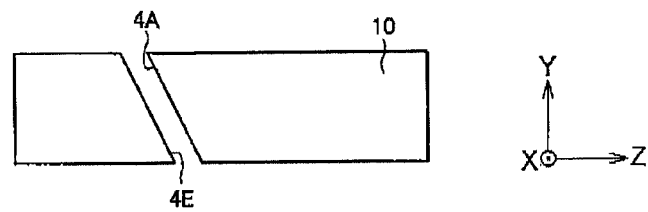
FIG. 20 is a cross-sectional view showing a cross-sectional shape at a plane perpendicular to the width direction (X-direction) of the core of the light guide serving as variant 8.

A variant of the configuration shown in FIG. 1 will be described in the configuration of the light guide 4 of the present embodiment. FIG. 20 is a cross-sectional view showing a cross-sectional shape at a plane perpendicular to the width direction (X-direction) of the core 10 of the light guide 4 serving as variant 8.

As shown in the figure, the core 10 of variant 7 has a configuration in which an opposing surface 4E is formed at a position facing the optical path conversion mirror 4A. The optical path conversion mirror 4A and the opposing surface 4E form a configuration in which a mirror cut groove 15 is formed.

(Variants 9 to 11)

Figure 21:
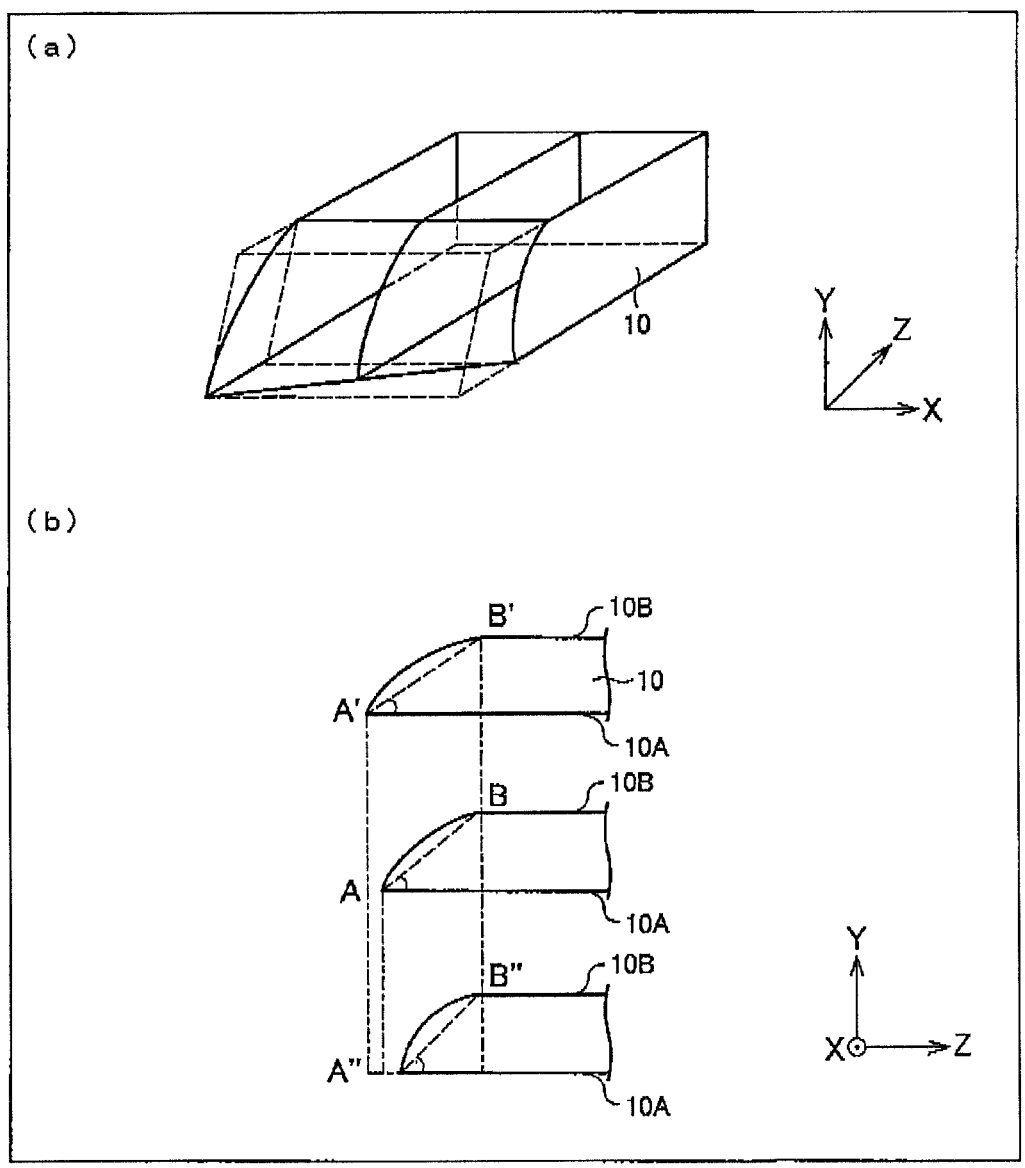
FIG. 21(a) is a perspective view of the core of the light guide serving as variant 9.
FIG. 21(b) is a cross-sectional view showing a cross-sectional shape at a plane perpendicular to the width direction (X-direction). The cross-sectional view of FIG. 21(b) shows, in order from the top, the side surface shape on the left side in the width direction of the core, the cross-sectional shape of the core at a plane passing through the central part in the width direction and being perpendicular to the width direction, and the side surface shape on the right side in the width direction of the core.

A variant of the configuration shown in FIG. 1 will be described in the configuration of the light guide 4 of the present embodiment. FIG. 21(*a*) is a perspective view of the core 10 of the light guide 4 serving as variant 9, and FIG. 21(*b*) is a cross-sectional view showing a cross-sectional shape at a plane perpendicular to the width direction (X-direction). The cross-sectional view of FIG. 21(*b*) shows, in order from the top, the side surface shape on the left side in the width direction of the core 10, the cross-sectional shape of the core 10 at a plane passing through the central part in the width direction and being perpendicular to the width direction, and the side surface shape on the right side in the width direction of the core 10. Points A, A', and A" are coupling points of the bottom surface 10A of the core 10 and the optical path conversion mirror 4C, and points B, B', and B" are coupling points of the top surface 10B of the core 10 and the optical path conversion mirror 4C.

As shown in FIG. 21(*a*), the core 10 in the light guide 4 of variant 9 has a configuration in which the optical path conversion mirror 4A is a curved surface. As shown in FIG. 21(*b*), the optical path conversion mirror 4A has a curved surface curved to a convex form with respect to the line AB in the cross-sectional shape at the plane perpendicular to the width direction (X-direction) of the core 10. The curvature radius of the optical path conversion mirror 4A serving as the curved surface of FIGS. 21(*a*) and 21(*b*) is constant in the width direction.

Figure 22:
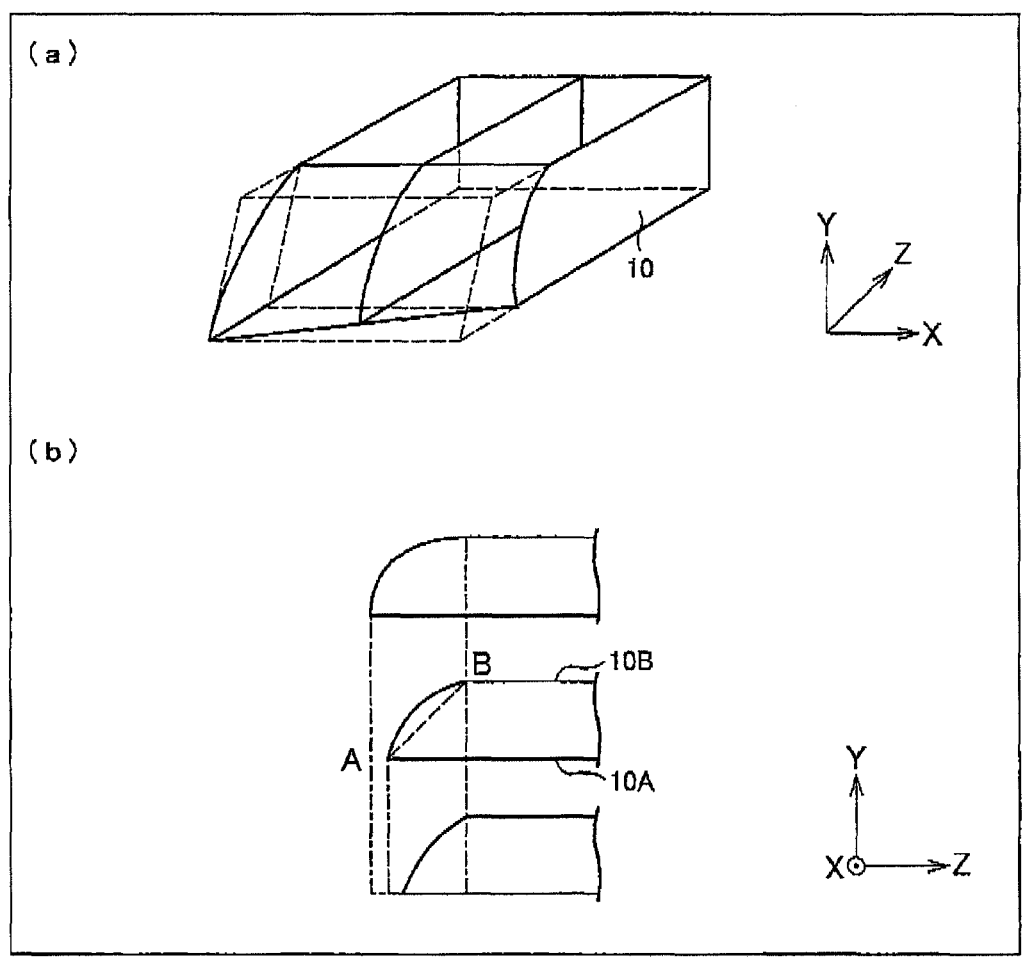
FIG. 22(a) is a perspective view of the core of the light guide serving as variant 10.
FIG. 22(b) is a cross-sectional view showing a cross-sectional shape at a plane perpendicular to the width direction (X-direction).

A variant of the configuration shown in FIGS. 21(*a*) and 21(*b*) will be described in the configuration of the light guide 4 of the present embodiment. FIG. 22(*a*) is a perspective view of the core 10 of the light guide 4 serving as variant 10, and FIG. 22(*b*) is a cross-sectional view showing a cross-sectional shape at a plane perpendicular to the width direction (X-direction).

As shown in FIG. 22(*b*), the optical path conversion mirror 4A has a curved surface curved to a convex form with respect to the line AB in the cross-sectional shape at the plane perpendicular to the width direction (X-direction) of the core 10, same as variant 9. The curvature radius of the optical path conversion mirror 4A in the light guide of variant 9 differs in the width direction, as opposed to variant 9.

Figure 23:
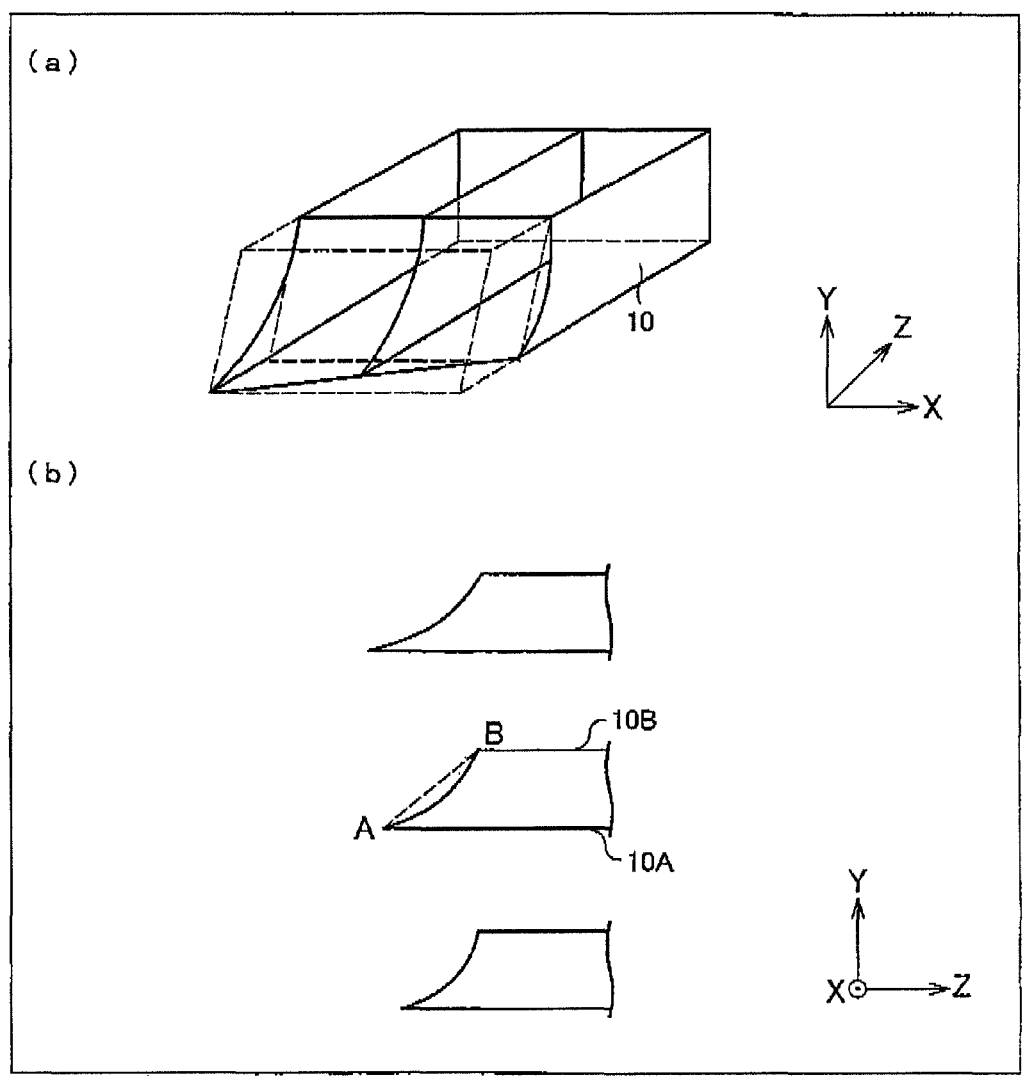
FIG. 23(a) is a perspective view of the core of the light guide serving as variant 11.
FIG. 23(b) is a cross-sectional view showing a cross-sectional shape at a plane perpendicular to the width direction (X-direction). The cross-sectional view of FIG. 23(b) shows, in order from the top, the side surface shape on the left side in the width direction of the core, the cross-sectional shape of the core at a plane passing through the central part in the width direction and being perpendicular to the width direction, and the side surface shape on the right side in the width direction of the core.

A variant of the configuration shown in FIGS. 21(*a*) and 21(*b*) will be described in the configuration of the light guide 4 of the present embodiment. FIG. 23(*a*) is a perspective view of the core 10 of the light guide 4 serving as variant 11, and FIG. 23(*b*) is a cross-sectional view showing a cross-sectional shape at a plane perpendicular to the width direction (X-direction).

As shown in FIG. 23(*b*), the optical path conversion mirror 4A has a curved surface curved to a concave form with respect to the line AB in the cross-sectional shape at the plane perpendicular to the width direction (X-direction) of the core 10, as opposed to variant 8.

The curvature radius and the inclination angle (inclination angle with respect to the light transmitting direction at the lines AB, A'B', A"B") of the optical path conversion mirror 4A serving as the curved surface of the core in the light guide of variants 9 to 11 can be appropriately set within a range of the effects of the twisted surface.

The optical path conversion mirror of the light guide has a configuration in which the inclination angle with respect to the longitudinal direction (Z-direction) of the line connecting one end and the other end in the height direction (Y-direction) differs in the width direction (X-direction). However, if the optical path conversion mirror is formed to a curved surface, the intensity distribution of the signal light can be uniformed even if the inclination angle is constant in the width direction.

(Variant 12)

Figure 24:
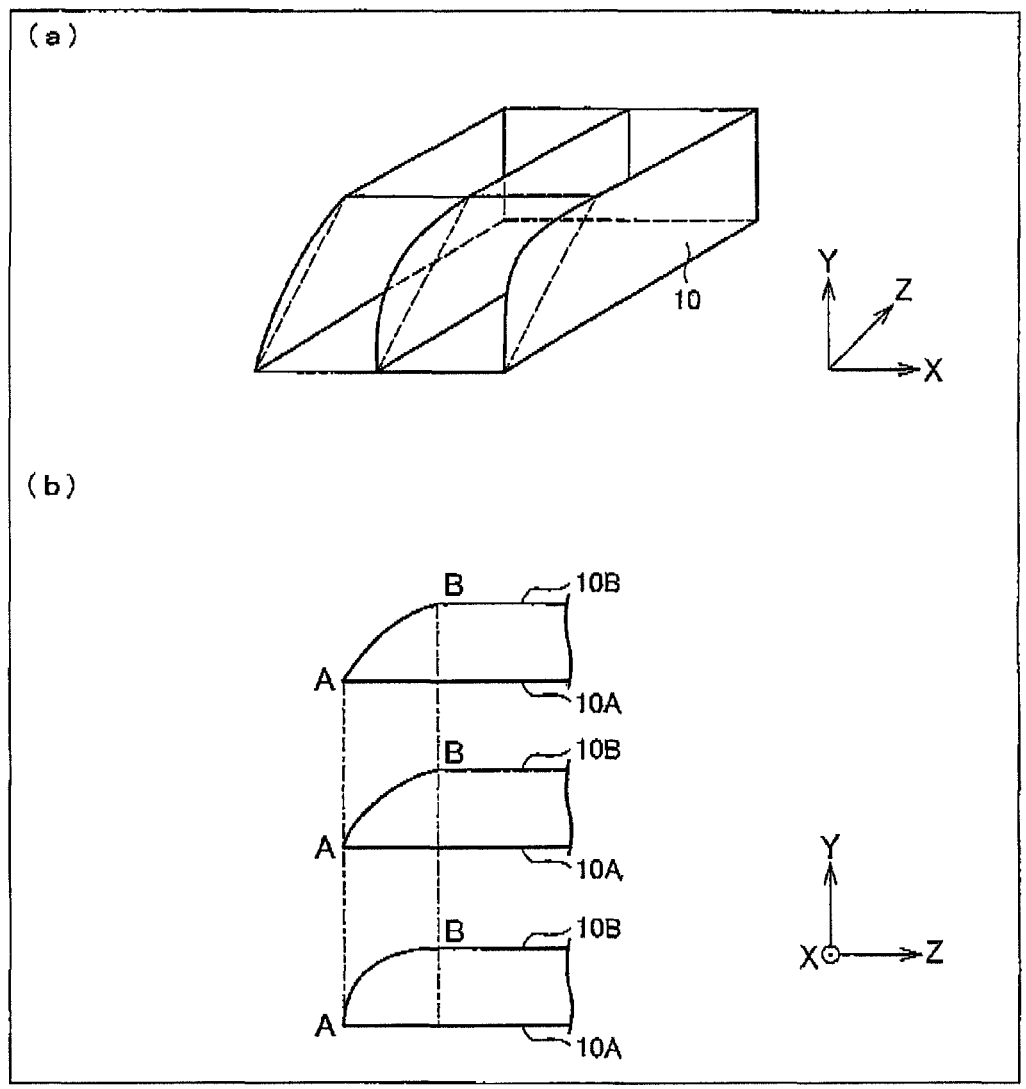
FIG. 24(a) is a perspective view of the core of the light guide serving as variant 12.
FIG. 24(b) is a cross-sectional view showing a cross-sectional shape at a plane perpendicular to the width direction (X-direction). The cross-sectional view of FIG. 24(b) shows, in order from the top, the side surface shape on the left side in the width direction of the core, the cross-sectional shape of the core at a plane passing through the central part in the width direction and being perpendicular to the width direction, and the side surface shape on the right side in the width direction of the core.

A variant of the light guide 4 when the inclination angle is constant in the width direction will now be described. FIG. 24(*a*) is a perspective view of the core 10 of the light guide 4 serving as variant 12, and FIG. 24(*b*) is a cross-sectional view showing a cross-sectional shape at a plane perpendicular to the width direction (X-direction). The cross-sectional view of FIG. 24(*b*) shows, in order from the top, the side surface shape on the left side in the width direction of the core 10, the cross-sectional shape of the core 10 at a plane passing through the central part in the width direction and being perpendicular to the width direction, and the side surface shape on the right side in the width direction of the core 10. Points A, A', and A" are coupling points of the bottom surface 10A of the core 10 and the optical path conversion mirror 4C, and points B, B', and B" are coupling points of the top surface 10B of the core 10 and the optical path conversion mirror 4C.

As shown in FIG. 24(*a*), the core 10 in the light guide 4 of variant 12 has a configuration in which the optical path conversion mirror 4A is a curved surface. As shown in FIG. 24(*b*), the optical path conversion mirror 4A has a curved surface curved to a convex form with respect to the line AB in the cross-sectional shape at the plane perpendicular to the width direction (X-direction) of the core 10. The inclination angle $\alpha$ of the line AB with respect to the Z-direction is the same in the side surface shape on the left side in the width direction of the core 10, the cross-sectional shape of the core 10 at a plane passing through the central part in the width direction and being perpendicular to the width direction, and the side surface shape on the right side in the width direction of the core 10. The curvature radius of the optical path conversion mirror 4A in the light guide of variant 12 differs in the width direction.

(Manufacturing Method of Light Guide)

The manufacturing procedure of the light guide of the present embodiment is not particularly limited as long as it is the manufacturing procedure including a core optical path conversion mirror forming step of forming the optical path conversion mirror of the core so that the inclination angle $\alpha$ with respect to the longitudinal direction differs in the width direction (X-direction) of the core. The core optical path conversion mirror forming step merely needs to be a step in which the optical path conversion mirror is formed in at least the core.

Thus, the manufacturing procedure of the light guide may be a procedure of first forming the core by flowing the material configuring the core to the die of the core, in which the optical path conversion mirror is a twisted surface. Thereafter, the light guide of the present embodiment is completed by embedding the formed core to the material configuring the clad or attaching the material configuring the clad to the core. When including the step of forming the core first, the completed light guide tends to have smaller difference in the index of refraction between the core and the clad. Thus, a step of arranging a metal mirror (reflection plate) at the optical path conversion mirror of the core is preferably provided.

The manufacturing procedure of the light guide may be a procedure including a stacked structure forming step of forming a stacked structure with a core and clad arranged to surround the periphery of the core. In other words, the optical path conversion mirror of the core is formed to a twisted surface by manufacturing in advance the stacked structure including the core and the clad, and cutting the end in the longitudinal direction of the light guide in the core optical path conversion mirror forming step. In this case, the core optical path conversion mirror forming step becomes a step of cutting the clad along with the core. If the manufacturing method of the light guide includes the stacked structure forming step, the optical path conversion mirror can be easily formed to a twisted surface since both the core and the clad having elastic force difference can be simultaneously cut.

A method of forming the optical path conversion mirror of the core to the twisted surface when the manufacturing method of the light guide includes the stacked structure forming step (core optical path conversion mirror forming step is a step of cutting the clad along with the core) will now be described. As described above, the twisted surface serving as the optical path conversion mirror of the core includes the following:

(i) twisted surface formed as a line or a curve that monotonously changes from one side surface towards the other side surface in the width direction of the core in the cross-sectional shape at a plane perpendicular to the height direction (Y-direction) of the core (light guide of FIG. 1, and light guides of variants 1 to 3), and (ii) twisted surface formed to s step difference shape or a zigzag shape with respect to the width direction (X-direction) in the cross-sectional shape at a plane perpendicular to the height direction (Y-direction) of the core (light guides of variants 4, 5).

In the manufacturing method of the twisted surface, the manufacturing procedures differ depending on the twisted surface of (i) or the twisted surface of (ii). The manufacturing method of the twisted surface will be more specifically described below.

(Method of Forming Twisted Surface of (i) (Light Guide of FIG. 1, and Light Guides of Variants 1 to 3)

Generally, the method of cutting the end of the light guide and forming the optical path conversion mirror in the core includes a method of using a blade and a method of using a laser.

When using the blade, the twisted surface of (i) can be formed by simultaneously cutting both the core and the clad having elastic force difference. Furthermore, the twisted surface of (i) can be formed by push-cutting or pull-cutting using the blade so as to pass through points I to IV of the core shown in FIG. 25. Moreover, the twisted surface of (i) can be formed by applying stress to the core and cutting using the blade with the core in the twisted shape.

The twisted surface of (i) can also be formed by blade cutting so that the inclination angle with respect to the longitudinal direction of the light guide is uniform in the width direction of the core, and thereafter deforming (compressing) the light incident side end of the light guide by applying heat.

Figure 25:
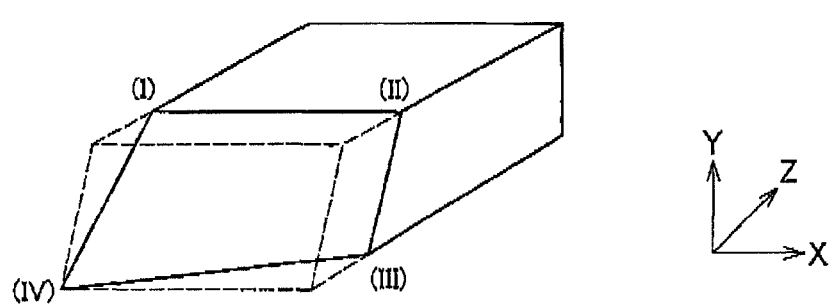
FIG. 25 is a perspective view showing points I to IV of the core the blade or the laser passes when cutting using the blade or the laser to form the optical path conversion mirror as a twisted surface.

When using the laser, the twisted surface of (i) can be formed by laser cutting so that the laser passes through points I to IV of the core shown in FIG. 25.

(Method of Forming Twisted Surface of (ii) (Light Guides of Variants 4, 5)

When cutting using the blade, the twisted surface of (ii) can be formed by cutting so that the inclination angle α differs in the width direction of the core with the blade inserted to the light guide over plural times (while repeating the reciprocating operation of the blade over plural times).

The twisted surface of (ii) can be formed by blade cutting so that the inclination angle with respect to the longitudinal direction of the light guide is uniform in the width direction of the core, and thereafter providing a step difference or a zigzag with respect to the width direction through cutting.

When using the laser, the twisted surface of (ii) can be formed by passing the laser to provide a step difference or a zigzag with respect to the width direction and performing laser cutting.

When cutting with the blade, the configuration formed with the mirror cut groove such as the light guide of variant 7 can be realized by stopping the cutting at the time point the optical path conversion mirror of the core is formed. Furthermore, the configuration formed with the mirror cut groove can be realized by passing the cutting stop position after stopping the blade cutting, and again blade cutting the light guide in a direction different from the inclination angle of the optical path conversion mirror of the core.

The configuration including the reflection plate such as the metal mirror can be realized by forming metal on the optical path conversion mirror after forming the optical path conversion mirror serving as the twisted surface of the core. A method of forming metal on the optical path conversion mirror includes a method of vapor depositing metal on the optical path conversion mirror and a method of attaching a metal piece.

Application Example

The optical module 1 of the present embodiment can be applied to the following application examples.

First, as a first application example, use can be made at the hinge portion in a foldable electronic device such as a foldable mobile phone, a foldable PHS (Personal Handy-phone System), a foldable PDA (Personal Digital Assistant), and a foldable notebook computer.

Figure 26:
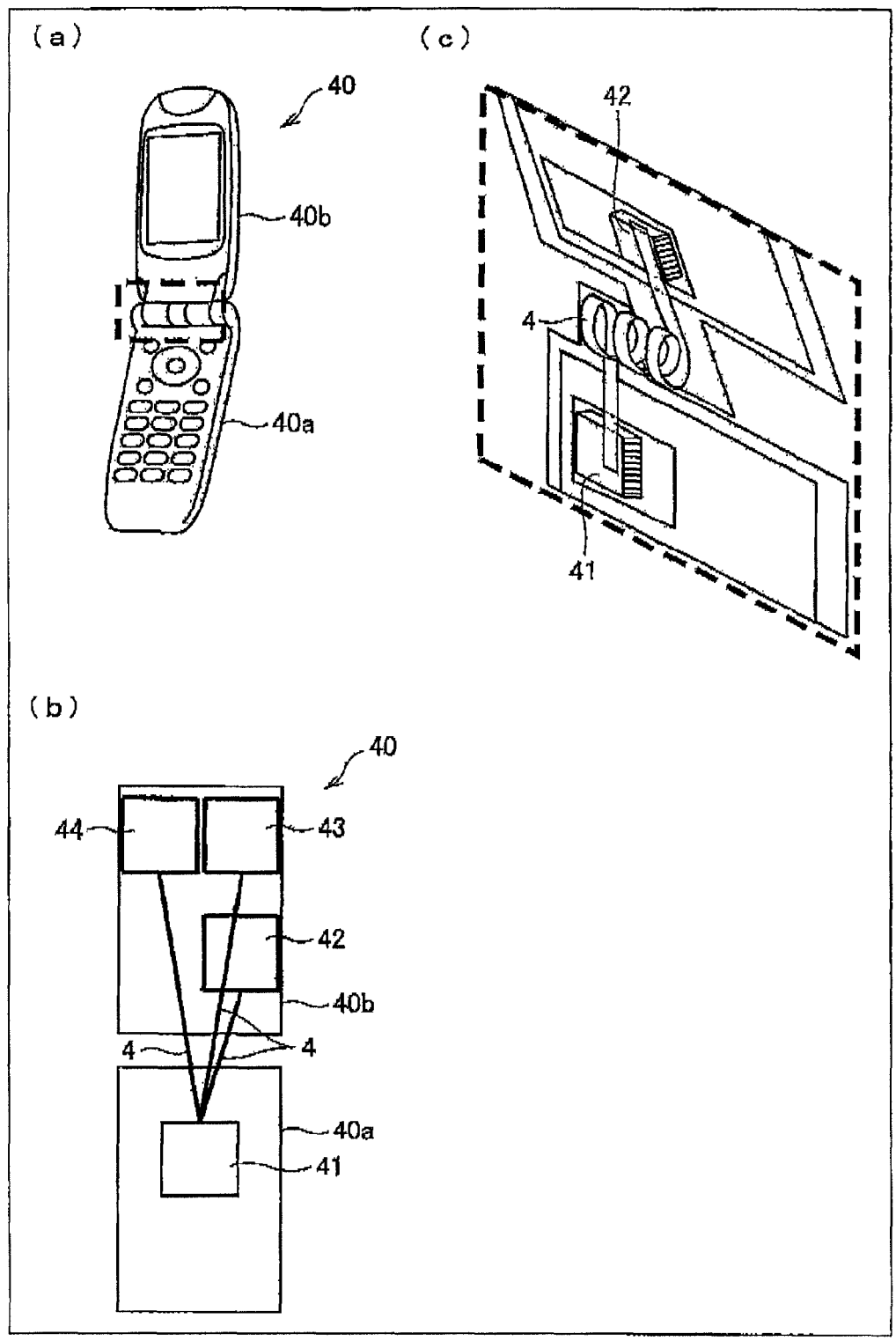
FIG. 26(a) is a perspective view showing an outer appearance of the foldable mobile phone incorporating the light guide according to the present embodiment.
FIG. 26(b) is a block diagram of a portion where the light guide is applied in the foldable mobile phone shown in FIG. 26(a)
FIG. 26(c) is a perspective plan view of the hinge portion in the foldable mobile phone shown in FIG. 26(a).

FIGS. 26(a) to 26(c) show an example in which the light guide 4 is applied to a foldable mobile phone 40. FIG. 26(a) is a perspective view showing an outer appearance of the foldable mobile phone 40 incorporating the light guide 4.

FIG. 26(b) is a block diagram of a portion where the light guide 4 is applied in the foldable mobile phone 40 shown in FIG. 26(a). As shown in the figure, a control unit 41 arranged on a body 40a side in the foldable mobile phone 40, and an external memory 42, a camera (digital camera) 43, and a display unit (liquid crystal display) 44 arranged on a lid (drive portion) 40b side rotatably arranged at one end of the body with the hinge portion as a shaft are connected by the light guide 4.

FIG. 26(c) is an exploded plan view of the hinge portion (portion surrounded with a broken line) in FIG. 26(a). As shown in the figure, the light guide 4 is wrapped around a supporting rod at the hinge portion and bent to thereby connect the control unit arranged on the body side, and the external memory 42, the camera 43, and the display unit 44 arranged on the lid side.

High speed and large capacity communication can be realized in a limited space by applying the light guide 4 to the foldable electronic device. Therefore, it is particularly suitable in devices where high speed and large capacity data communication is necessary and miniaturization is demanded such as the foldable liquid crystal display device.

As a second application example, the light guide 4 is applied to a device having a drive portion such as a printer head in a printing device (electronic device) and a reading unit in a hard disc recording and reproducing device.

Figure 27:
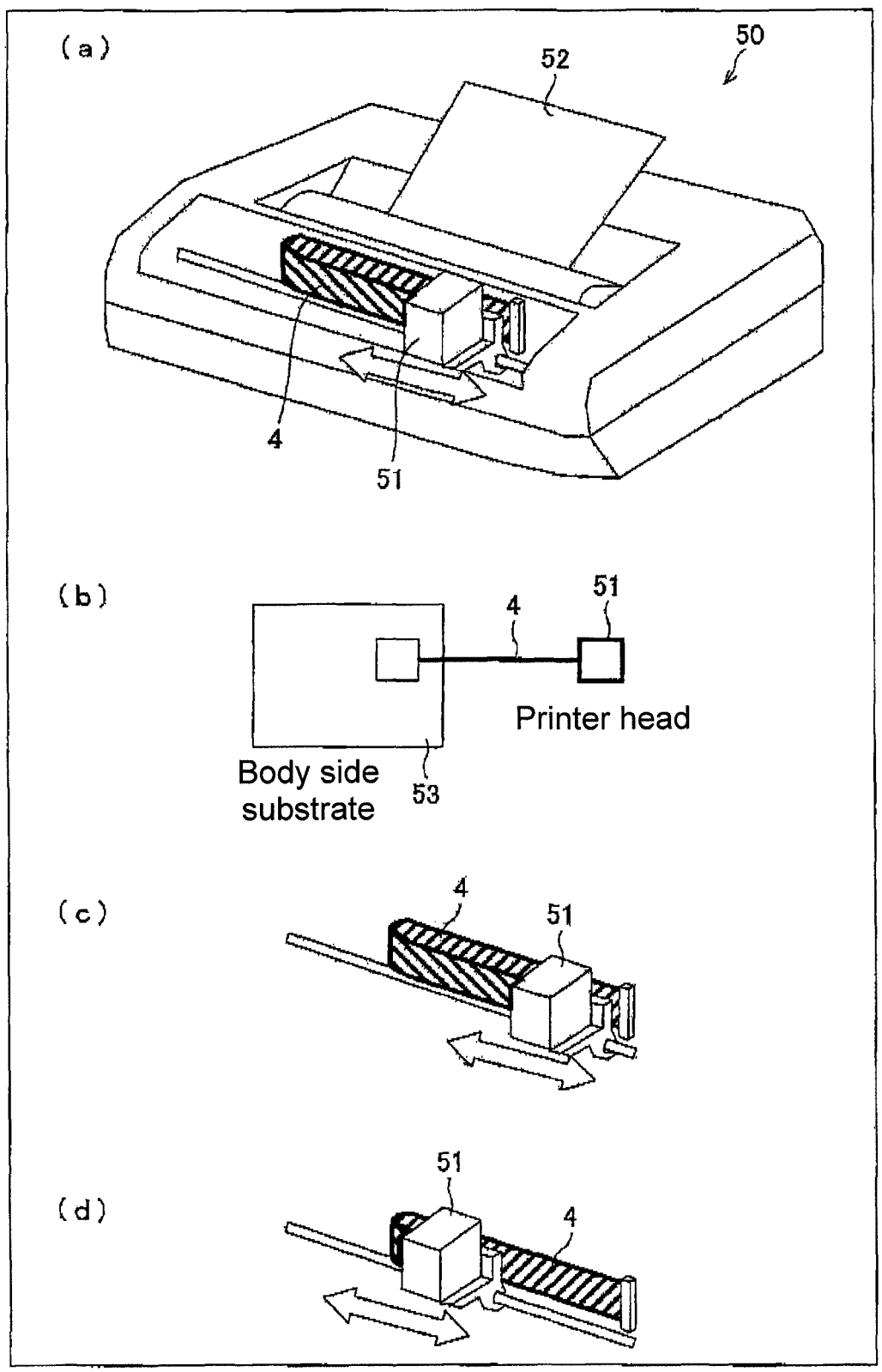
FIG. 27(a) is a perspective view showing an outer appearance of a printing device including the light guide according to the present embodiment.
FIG. 27(b) is a block diagram showing the main parts of the printing device shown in FIG. 27(a), and FIGS. 27(c) and 27(d) are perspective views showing a curved state of the light guide when the printer head is moved (driven) in the printing device.

FIGS. 27(a) to 27(c) show an example in which the light guide 4 is applied to a printing device 50. FIG. 27(a) is a perspective view showing an outer appearance of the printing device 50. As shown in the figure, the printing device 50 includes a printer head 51 for performing printing on a paper 52 while moving in a width direction of a paper 52, where one end of the light guide 4 is connected to the printer head 51.

FIG. 27(b) is a block diagram of a portion where the light guide 4 is applied in the printing device 50. As shown in the figure, one end of the light guide 4 is connected to the printer head 51, and the other end is connected to a body side substrate in the printing device 50. The body side substrate includes a control means etc. for controlling the operation of each unit of the printing device 50.

FIGS. 27(c) and 27(d) are perspective views showing a curved state of the light guide 4 when the printer head 51 is moved (driven) in the printing device 50. As shown in the figure, when the light guide 4 is applied to the drive portion such as the printer head 51, the curved state of the light guide 4 changes by the drive of the printer head 51 and each position of the light guide 4 repeatedly curves.

Therefore, the optical module 1 according to the present embodiment is suited for such drive portion. High speed and large capacity communication using the drive portion can be realized by applying the optical module 1 to such drive portion.

Figure 28:
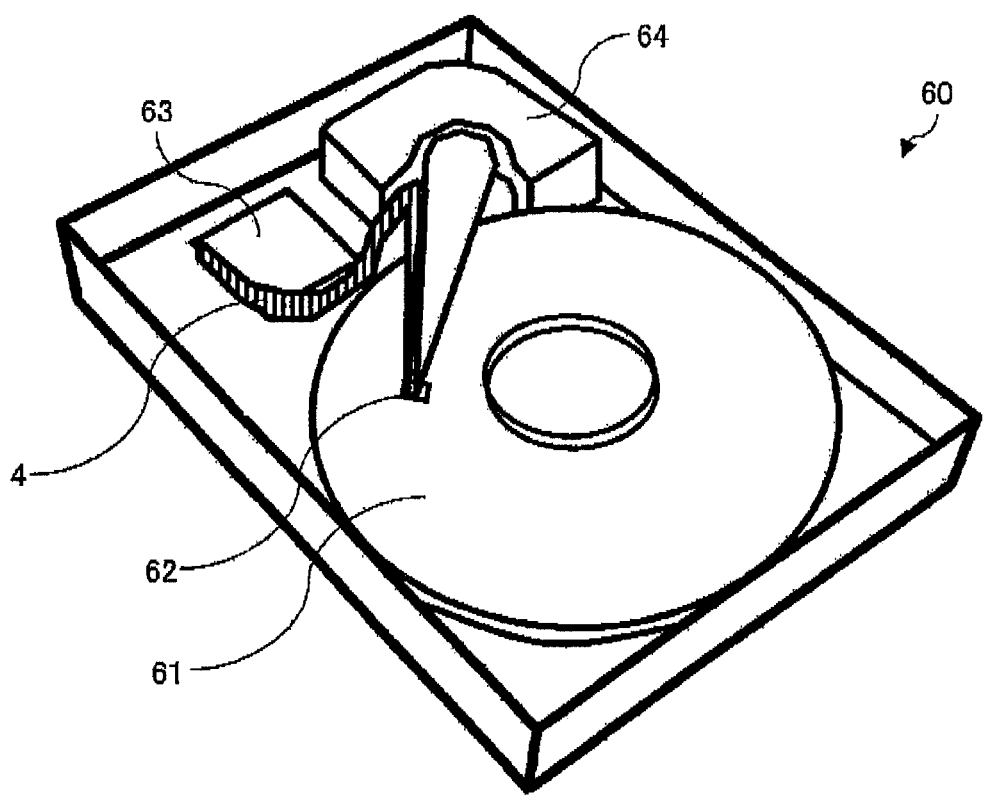
FIG. 28 is a perspective view showing an outer appearance of a hard disc recording and reproducing device including the light guide according to the present embodiment.
Figure 29:
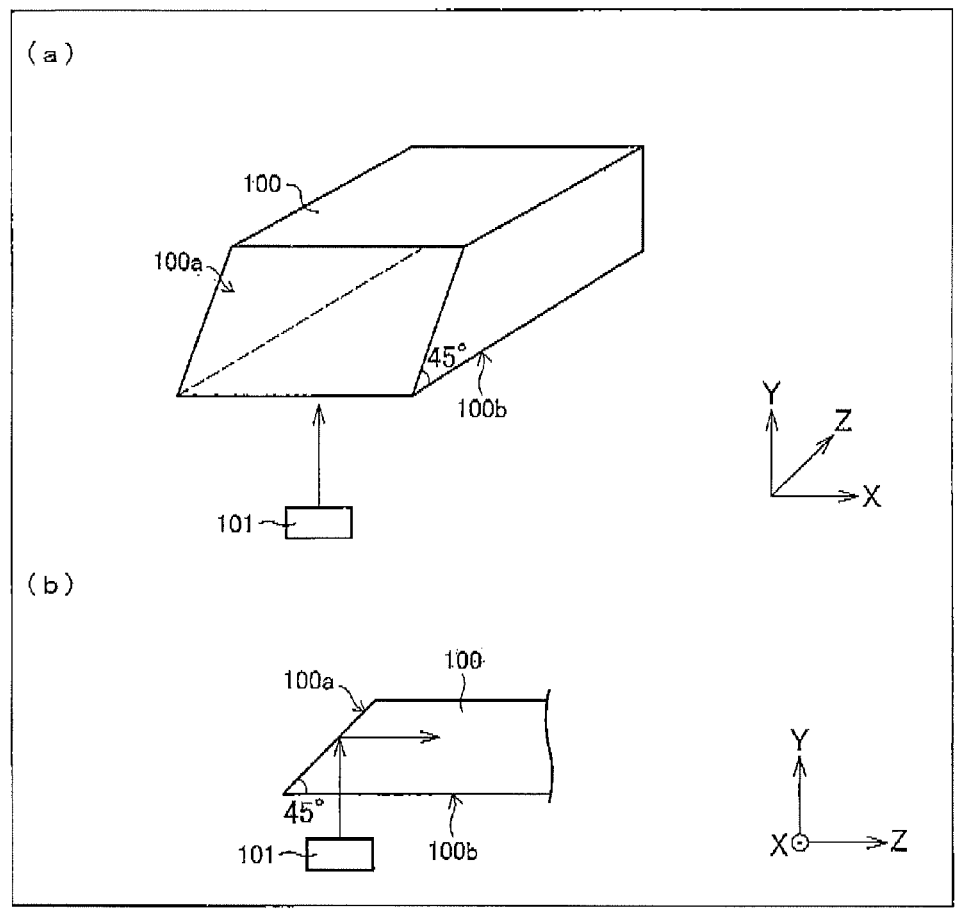
FIGS. 29(a) and 29(b) show a configuration of a conventional light guide, where

FIG. 28 shows an example in which the light guide 4 is applied to a hard disc recording and reproducing device 60.

As shown in the figure, the hard disc recording and reproducing device 60 includes a disc (hard disc) 61, a head (read/write head) 62, a substrate introducing portion 63, a drive portion (drive motor) 64, and the light guide 4.

The drive portion 64 drives the head 62 along a radial direction of the disc 61. The head 62 reads the information recorded on the disc 61 and writes information on the disc 61. The head 62 is connected to the substrate introducing portion 63 by way of the light guide 4, and propagates the information read from the disc 61 to the substrate introducing portion 63 as an optical signal and receives the optical signal of the information to write to the disc 61 propagated from the substrate introducing portion 63.

Therefore, high speed and large capacity communication can be realized by applying the light guide 4 to the drive portion such as the head 62 in the hard disc recording and reproducing device 60.

As described above, in the light guide according to the present invention, the optical path conversion mirror surface has a configuration in which an angle formed with the bottom surface of the core changes in the X-direction in the cross-sectional shape in which the optical path conversion mirror portion is cut at the YZ plane, with the optical axis direction of the optical element is the Y-direction, the advancing direction of the signal light of the light guide as the Z-direction, and the direction perpendicular to both the Y-direction and the Z-direction as the X-direction.

As described above, the light transmission module according to the present invention is configured to include the light guide, and the optical element for applying light to the core of the light guide.

As described above, the electronic device according to the present invention is configured to include the light transmission module.

Furthermore, as described above, the manufacturing method of the light guide according to the present invention includes a core optical path conversion mirror forming step of forming the optical path conversion mirror of the core as an inclined surface inclined with respect to the Z-direction of the light guide, with the advancing direction of the signal light of the light guide as the Z-direction, where the optical path conversion mirror surface is formed in the core optical path conversion mirror forming step by cutting the core so that the angle formed with the bottom surface of the core changes in the X-direction in the cross-sectional shape in which the optical path conversion mirror portion is cut at the YZ plane, with the optical axis direction of the optical element as the Y-direction and the axis perpendicular to both the Y-direction and the Z-direction as the X-direction.

Therefore, the intensity distribution of the signal light can be uniformed closer to the optical path conversion mirror of the light guide compared to the conventional flexible light guide, and consequently, the amount of loss of the signal light can be stably controlled.

In the light guide according to the present invention, the optical path conversion mirror surface is preferably formed so that the angle formed with the bottom surface of the core increases from one end towards the other end in the X-direction in the cross-sectional shape in which the optical path conversion mirror portion is cut at the YZ plane.

According to the above configuration, the intensity distribution of the signal light after being reflected at the optical path conversion mirror surface is uniformed faster than with the conventional light guide since the intensity distribution of the signal light can be more diffused. The amount of loss of the signal light thus can be stably controlled.

In the light guide according to the present invention, the optical path conversion mirror surface is preferably formed so that the shape of the curve changes from one end towards the other end in the X-direction in the cross-sectional shape in which the optical path conversion mirror portion is cut at the YZ plane.

Therefore, the plural peak lights have an optical path width sufficient for the intensity distribution to uniform near the optical path conversion mirror.

In the light guide according to the present invention, preferably, an area where the angle is a maximum exists on one side in the X-direction and an area where the angle is a minimum exists on the other side in the X-direction in the optical path conversion mirror portion, where the center in the X-direction of the core is the origin and such origin is the reference.

According to the above configuration, the inclination angle with respect to the X-direction of the optical path conversion mirror becomes steep as an area where the angle is a maximum exists on one side in the X-direction and an area where the angle is a minimum exists on the other side in the X-direction in the optical path conversion mirror portion, where the origin is the reference. Therefore, the peak light can be reflected to the direction closer to the X-direction, and the intensity distribution of the signal light can be uniformed faster.

In the light guide according to the present invention, the core is preferably formed so that the length in the X-direction is longer than the length in the Y-direction in the cross-sectional shape at a plane perpendicular to the Z-direction of the core.

According to the above configuration, the core is formed so that the length in the X-direction is longer than the length in the Y-direction, and thus the area of the core necessary for optically coupling with the light source can be ensured and the coupling efficiency can be enhanced even if the thickness of the light guide is made thin.

In the light guide according to the present invention, the clad that is made of material having an index of refraction different from that of the core and that surrounds the core is preferably arranged.

The signal light thus can be reflected to the interior of the core at the boundary surface of the core and the clad, and the signal light can be more reliably transmitted in the core. If the light guide includes the core and the clad, the cross-sectional shape in which the optical path conversion mirror portion is cut at the YZ plane may be such that the angle formed by the optical path conversion mirror surface of only the core and the bottom surface of the core changes in the X-direction, or the angle formed by the optical path conversion mirror surface of both the core and the clad and the bottom surface of the core changes in the X-direction.

In the light guide according to the present invention, a reflection layer for reflecting the light applied from the light source is preferably arranged on the optical path conversion mirror.

Therefore, the light applied from the light source can be efficiently reflected at the optical path conversion mirror.

The light guide of the present invention may have flexibility.

The manufacturing method of the light guide of the present invention includes a stack forming step of forming a stack including a core made of material having translucency and a clad made of material having an index of refraction different from the index of refraction of the core, where the optical path conversion mirror surface is preferably formed by cutting the stack so that the angle formed with the bottom surface of the core changes in the X-direction in the cross-sectional shape in which the optical path conversion mirror portion is cut at the YZ plane in the core optical path conversion mirror forming step.

According to the above configuration, the stack is cut so that the angle formed with the bottom surface of the core changes in the X-direction in the cross-sectional shape in which the optical path conversion mirror portion is cut at the YZ plane in the core optical path conversion mirror forming step, so that the light guide according to the present invention can be completed at the stage the optical path conversion mirror surface is formed. The manufacturing procedure of the light guide does not become complicating, and is simplified.

Specific embodiments or examples described in the section BEST MODE FOR CARRYING OUT THE INVENTION merely clarify the technical contents of the present invention and are not to be construed in a narrow sense limiting only to such specific examples, and embodiments obtained by appropriately combining technical means disclosed in different embodiments are encompassed in the technical scope of the invention within the spirit of the invention and the scope of the attached Claims.

INDUSTRIAL APPLICABILITY

The light guide according to the present invention is applicable to the optical communication path between various types of devices, and is also applicable to a flexible optical wiring serving as an in-device wiring mounted in a small and thin commercial-off-the-shelf device.

The invention claimed is:

1. A light guide comprising:
a core made of material having translucency; and
an optical path conversion mirror portion formed with an optical path conversion mirror surface, on at least the core at an end, for reflecting a signal light from an optical element and converting the optical path of the signal light,
wherein the signal light is transmitted through the core by the reflection at the optical path conversion mirror surface,
wherein the optical path conversion mirror surface has an angle formed with a bottom surface of the core changing in an X-direction in a cross-sectional shape in which the optical path conversion mirror portion is cut at a YZ plane, the Y-direction being an optical axis direction of the optical element, the Z-direction being an advancing direction of the signal light of the light guide, and the X-direction being a direction perpendicular to both the Y-direction and the Z-direction, and
wherein cross-sectional shapes of an upper side and a lower side of the optical path conversion mirror are asymmetric to a center cross-sectional shape of the core in the X-direction.

2. The light guide according to claim 1, wherein the optical path conversion mirror surface is formed such that the angle formed with the bottom surface of the core increases from one end towards the other end in the X-direction in the cross-sectional shape in which the optical path conversion mirror portion is cut at the YZ plane.

3. The light guide according to claim 1, wherein the optical path conversion mirror surface is formed to a curve, the shape of the curve changing from one end towards the other end in the X-direction in the cross-sectional shape in which the optical path conversion mirror portion is cut at the YZ plane.

4. The light guide according to claim 1, wherein if the center in the X-direction of the core is an origin, an area where the angle is a maximum exists on one side in the X-direction and an area where the angle is a minimum exists on the other side in the X-direction in the optical path conversion mirror portion with the origin as a reference.

5. The light guide according to claim 1, wherein the core is formed such that a length in the X-direction is longer than a length in the Y-direction in a cross-sectional shape at a plane perpendicular to the Z-direction of the core.

6. The light guide according to claim 1, further comprising a clad made of material having an index of refraction different from the core, and being arranged to surround the core.

7. The light guide according to claim 1, wherein a reflection layer for reflecting the light applied from the optical element is arranged on the optical path conversion mirror.

8. The light guide according to claim 1, having flexibility.

9. A light transmission module comprising:
the light guide according to claim 1; and
an optical element for applying light to the core of the light guide.

10. An electronic device comprising the light transmission module according to claim 9.

11. A light guide comprising:
a core made of material having translucency; and
an optical path conversion mirror portion formed with an optical path conversion mirror surface, on at least the core at an end, for reflecting a signal light from an optical element and converting the optical path of the signal light,
wherein the signal light is transmitted through the core by the reflection at the optical path conversion mirror surface,
wherein the optical path conversion mirror surface has an angle formed with a bottom surface of the core changing in an X-direction in a cross-sectional shape in which the optical path conversion mirror portion is cut at a YZ plane, the Y-direction being an optical axis direction of the optical element, the Z-direction being an advancing direction of the signal light of the light guide, and the X-direction being a direction perpendicular to both the Y-direction and the Z-direction; and
wherein the optical path conversion mirror surface is formed such that the angle formed with the bottom surface of the core increases from one end towards the other end in the X-direction in the cross-sectional shape in which the optical path conversion mirror portion is cut at the YZ plane.

12. A light guide comprising:
a core made of material having translucency; and
an optical path conversion mirror portion formed with an optical path conversion mirror surface, on at least the core at an end, for reflecting a signal light from an optical element and converting the optical path of the signal light,
wherein the signal light is transmitted through the core by the reflection at the optical path conversion mirror surface,
wherein the optical path conversion mirror surface has an angle formed with a bottom surface of the core changing in an X-direction in a cross-sectional shape in which the optical path conversion mirror portion is cut at a YZ plane, the Y-direction being an optical axis direction of the optical element, the Z-direction being an advancing direction of the signal light of the light guide, and the X-direction being a direction perpendicular to both the Y-direction and the Z-direction; and
wherein the optical path conversion mirror surface is formed to a curve, the shape of the curve changing from one end towards the other end in the X-direction in the cross-sectional shape in which the optical path conversion mirror portion is cut at the YZ plane.

13. A light guide comprising:

a core made of material having translucency; and an optical path conversion mirror portion formed with an optical path conversion mirror surface, on at least the core at an end, for reflecting a signal light from an optical element and converting the optical path of the signal light, wherein the signal light is transmitted through the core by the reflection at the optical path conversion mirror surface, wherein the optical path conversion mirror surface has an angle formed with a bottom surface of the core changing in an X-direction in a cross-sectional shape in which the optical path conversion mirror portion is cut at a YZ plane, the Y-direction being an optical axis direction of the optical element, the Z-direction being an advancing direction of the signal light of the light guide, and the X-direction being a direction perpendicular to both the Y-direction and the Z-direction; and wherein if a center in the X-direction of the core is an origin, an area where the angle is a maximum exists on one side in the X-direction and an area where the angle is a minimum exists on the other side in the X-direction in the optical path conversion mirror portion with the origin as a reference.

* * * * *